United States Patent [19]

Goff

[11] 4,018,118
[45] Apr. 19, 1977

[54] HIGH SPEED PRECISION METAL CUTTING SAW ASSEMBLY

[76] Inventor: Edward W. Goff, 1165 Ribier Court, Sunnyvale, Calif. 94087

[22] Filed: Nov. 25, 1974

[21] Appl. No.: 526,847

[52] U.S. Cl. .................................. 83/167; 83/282; 83/415; 83/460; 83/468; 83/471.2; 83/477.2; 83/488; 269/26

[51] Int. Cl.² ..................... B23D 45/02; B26D 7/00

[58] Field of Search ............. 83/94, 102, 104, 160, 83/167, 268, 282, 415, 419–421, 452, 460, 467–468, 471.2, 477.2, 485, 487–489, 614, 629, 758, 100; 269/25–26, 204, 266–267, 319; 144/252; 51/270

[56] References Cited

UNITED STATES PATENTS

| 963,348 | 7/1910 | Wood | 269/26 |
|---|---|---|---|
| 2,229,638 | 1/1941 | Chamberlin et al. | 83/102 X |
| 2,654,640 | 10/1953 | Bullard | 308/3 A |
| 2,870,802 | 1/1959 | Richards | 83/471.2 |
| 3,207,016 | 9/1965 | Huff | 83/488 X |
| 3,456,697 | 7/1969 | Rutzebeck | 83/471.2 |
| 3,494,232 | 2/1970 | Lindau | 83/100 |
| 3,713,358 | 1/1973 | Honeycutt et al. | 83/167 X |
| 3,757,618 | 9/1973 | Kuts | 83/488 X |
| 3,838,723 | 10/1974 | Sandberg | 144/136 R X |
| 3,878,744 | 4/1975 | Luxnat | 83/488 X |
| 3,897,982 | 8/1975 | Teramachi | 308/3 A |

*Primary Examiner*—Donald R. Schran
*Attorney, Agent, or Firm*—John J. Leavitt

[57] ABSTRACT

Presented is a precision power saw assembly which includes a saw table manufactured to exceedingly close tolerances and on which a circular saw blade and its driving apparatus is suspended. The saw blade is mounted for horizontal translation from one end of the saw table to the other together with its driving motor. A stop plate adjustable to close tolerances is mounted on the top of the saw table and provides an abutment against which the edge of a workpiece may abut. Additionally, a multiplicity of fluid operated clamps are provided to clamp the workpiece in proper position and retain it in such position during the entire cutting operation.

25 Claims, 21 Drawing Figures

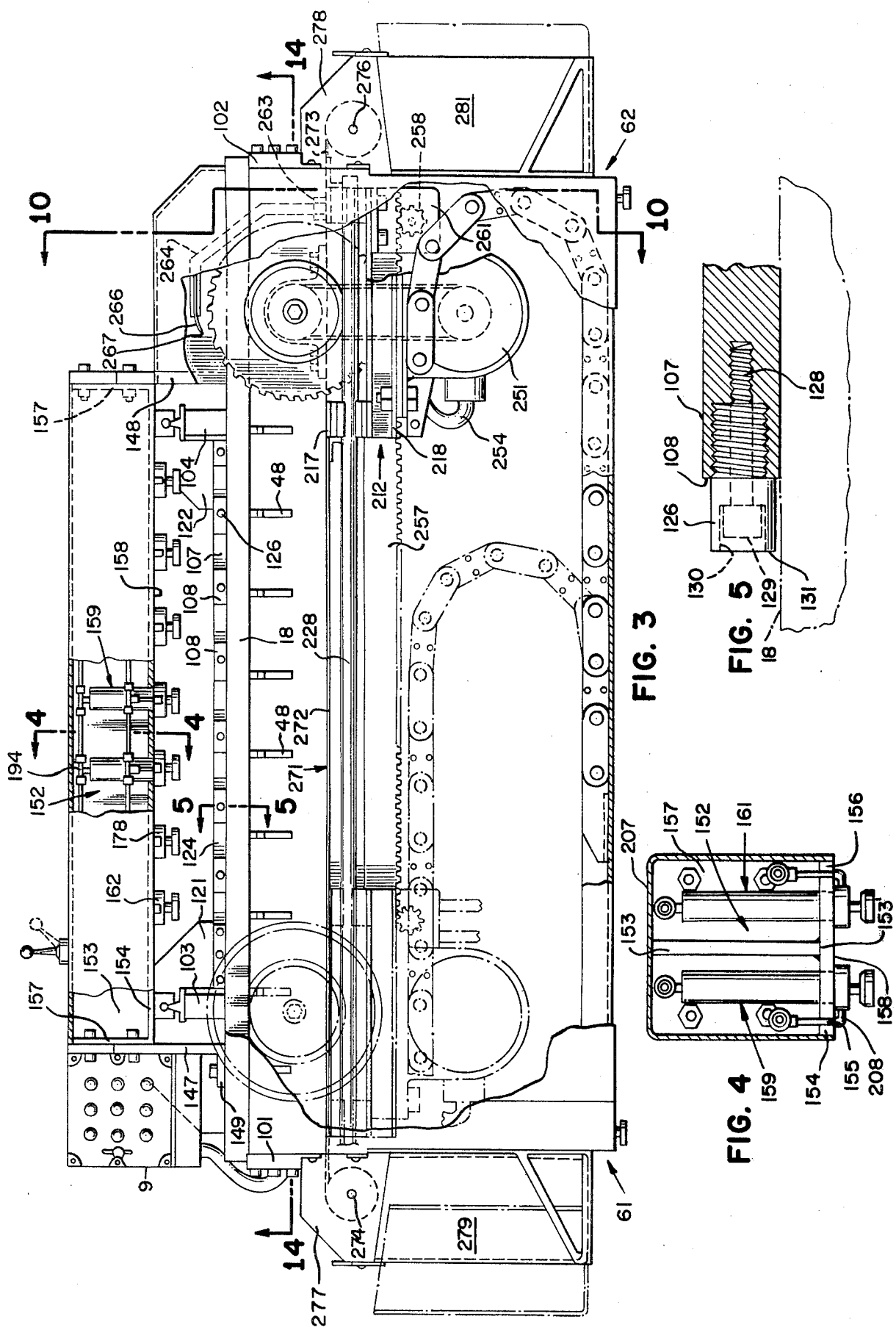

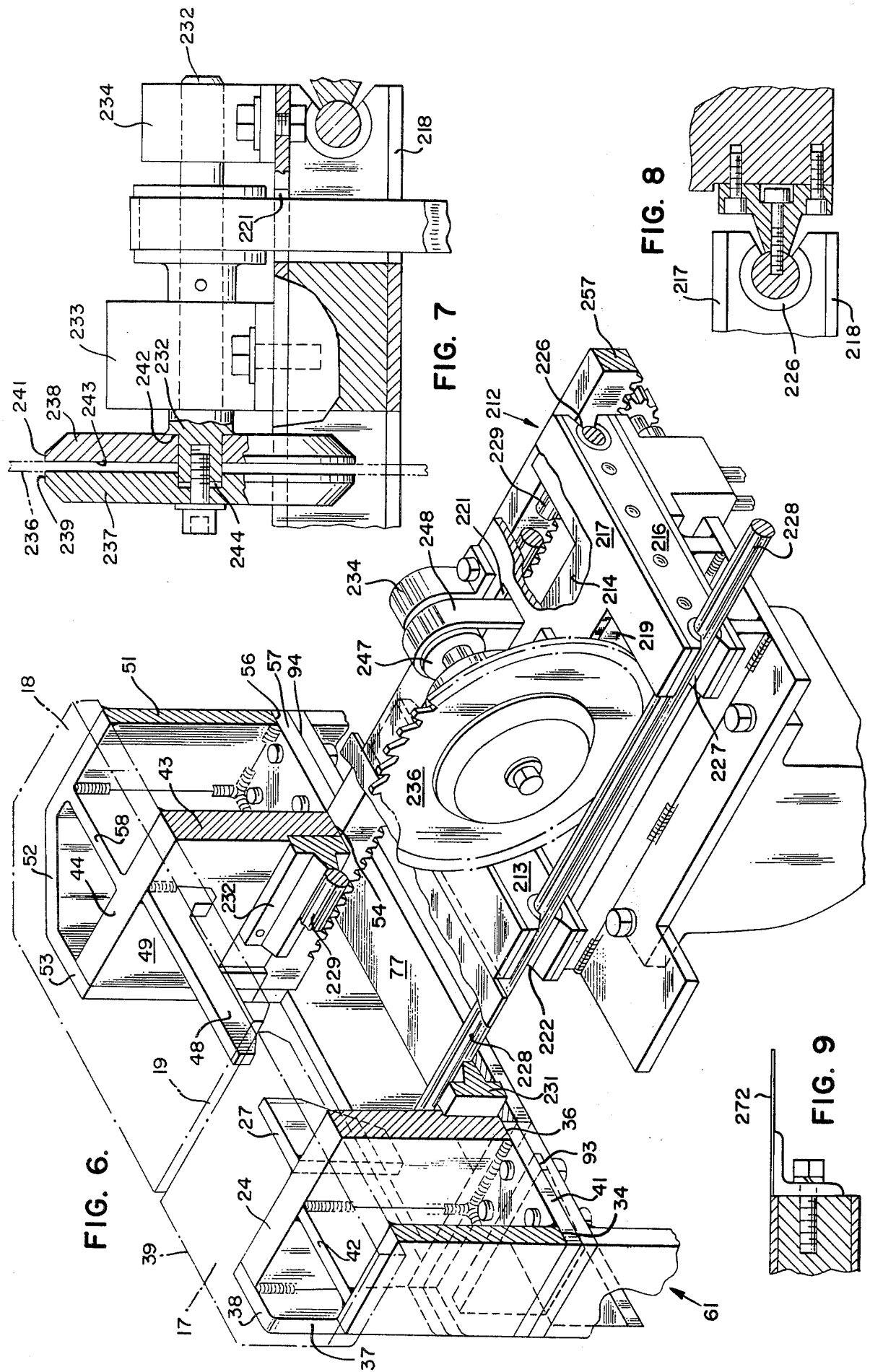

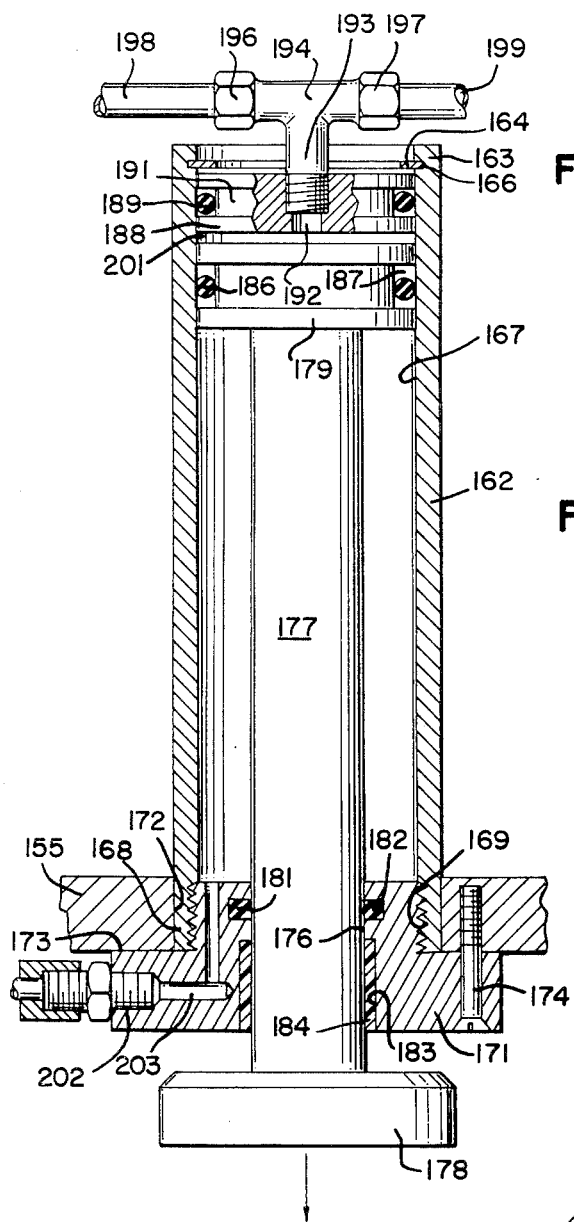
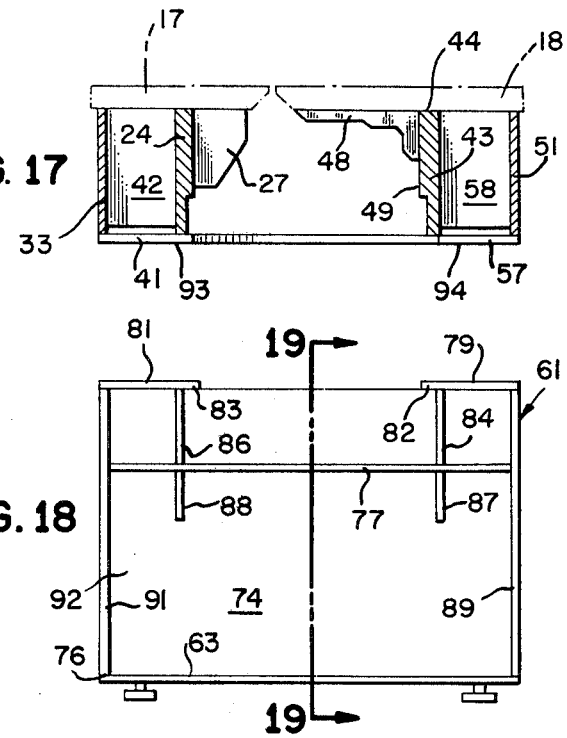
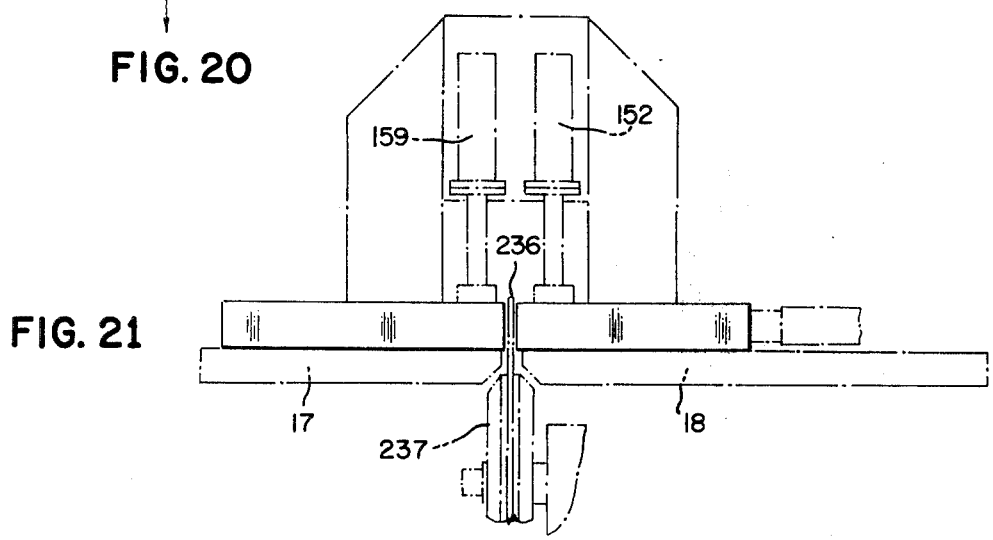
FIG. 20
FIG. 17
FIG. 18
FIG. 19
FIG. 21

HIGH SPEED PRECISION METAL CUTTING SAW ASSEMBLY

A saw table support base is formed from substantially identical assemblies adapted to underlie opposite ends of the saw table. The saw table support is provided with pairs of precision ground surfaces adapted to mate with complimentarily precision ground surfaces formed on the underside of the saw table so that the saw table and its support interengage with a precision that leaves no space for relative movement between the saw table and the support bases. It is important to note that the work surface of the saw table on which a work piece is received is also precision ground so that it is perfectly parallel with the bottom ground surface of the saw table that mates with the support base.

Additionally, in order to prevent wracking of the saw table, the saw table is fabricated in two elongated parts, each part including a massive table top section constituting a heavy steel slab to the underside of which, running longitudinally along a substantially median plane, is welded a similarily heavy vertically arranged plate to form with each table top section a generally T-section of great rigidity. Each of the vertical plates is precision cut and welded to the underside of the table top section in a perpendicular relationship to the precision ground surface of the table top. For additional rigidity and resistance to vibration and wracking, the outboard edge of each of the table top sections has welded thereto a second heavy vertical plate lying laterally spaced from the first vertical plate and having exactly the same height thereof. A third horizontally disposed plate is welded to the lower edges of the two vertical plates and lies substantially parallel to the associated table top sections so as to provide a ground surface thereon which is precisely parallel to the second surface forming the work surface of the table saw.

Thus, each longitudinal section of the saw table is formed as a modified box section having a cantilever portion projecting toward the opposite section to provide the slot through which the operative portion of the saw blade projects. To prevent vibration of the cantilever saw table projections, appropriate reinforcing gussets are welded in the angle between the projecting table top section and the associated heavy vertical plate forming the stem of the T-section. The precision manufactured and ground table top sections are joined at opposite ends to rigidly retain the table top sections in flat planar alignment one with the other.

BACKGROUND OF THE INVENTION

This invention relates to power saws, and particularly to power saws of the table type as distinguished from the cantilever beam type, and relates especially to the type of table saw in which the table is stationary and the high velocity rotating saw blade is caused to travel from one end of the saw table to the other as it passes through a workpiece supported on the saw table. The power saw of the invention also relates to a saw construction fabricated to such close tolerances and so constructed as to eliminate substantially all factors that would lead to inaccuracies in the cutting of a workpiece.

In analyzing prior art saw structures to determine why such saw structures cannot cut metal to the close tolerances and with the finished quality of the subject invention, it has been determined that the deficiency in all of these saw structures is the failure to maintain without modification during operation the relationship between the spindle of the saw and the table on which the workpiece to be cut is supported. Accordingly, it is a primary object of the subject invention to provide a saw table and support therefore which is capable of supporting a moveable saw blade carriage and a workpiece on which the saw blade is to cut in such a way as to preclude vibration, deflection, warping or wracking of the saw table and the workpiece supported thereon in relation to the saw blade.

Another object of the invention is the provision of a table saw assembly for cutting heavy slabs of metal and other materials in which the workpiece or material to be cut is securely clamped immovable on the saw table and the saw blade is caused to move in relation to both the saw table and the workpiece.

It is of course known that saw structures have been constructed in which the workpiece is held stationary and the rotating saw blade moves through the stationary work. So far as is known, however, no satisfactory clamping means has been devised which prevents slippage of the workpiece in relation to the work table as a result of vibrations set up in the saw table as a result of the cutting operation. Accordingly, a still further object of the invention is to provide fluid operated clamp means for clamping both the workpiece stock and the portion cut therefrom securely to the work table.

Analysis has indicated that to provide a quality edge finish on the cut edge of a workpiece it is necessary that the relationship between the spindle on which the saw blade is supported for rotation, the saw table on which the workpiece is supported, and the workpiece itself be maintained constant during the full excursion of the saw blade from one end of the saw table to the other. In addition, it is necessary that the guide of the rotating saw be effected with such precision that substantially no variation will occur from one end of the cut to the other, or that whatever variation does occur is within close tolerances of say 0.002 inch. Accordingly, a still further object of the invention is to provide a saw table which is extremely rigid and resistant to deflection and vibration and a saw blade carriage mounted on such saw table in such a manner as to be precisely guided during its excursion from one end of the table to the other.

Prior art power saws for cutting metal using a circular saw blade have been limited in the thicknesses which may be cut. It is therefore a still further object of the present invention to provide a precision power saw utilizing a circular blade capable of making close tolerance cuts (0.0002 inch) with high quality edge finishes in metal and plastic plates and other shapes ranging up to at least 6 inches in thickness.

Heretofore it has been impossible to secure commercially cut metal work guaranteed to specific tolerances. Accordingly, it is another object of the present invention to provide a precision power saw capable of producing cuts in ¾ inch metal plates which can be commercially guaranteed to be within plus or minus 0.002 inch with an edge finish of approximately 20 m.f.

It is a further object of the present invention to provide a precision saw table construction having an elongated saw blade slot and constructed in such a manner that the saw blade makes an extremely accurate traverse of the saw slot in the table top.

Yet another object of the present invention is to provide work clamping means in association with a saw table which will maintain a positional stability of work clamped upon such saw table with such precision as to enable the maintenance of cut tolerances and finished qualities of the order of those given above.

With many conventional saws it is difficult to accurately position the workpiece on the saw table to secure the desired cut. Accordingly, it is a still further object of the invention to provide a workpiece positioning gauge associated with the table top which may be precisely adjusted to determine the amount of cut to be made.

The invention possesses other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the power saw structure of the invention comprises a table saw assembly, a support base assembly on which the table saw assembly is supported, a saw blade carriage assembly moveably disposed on the saw table assembly so as to permit longitudinal excursion of a saw blade for the entire length of the saw table, and workpiece positioning and clamping means mounted on the saw table so as to hold a workpiece firmly in position prior to, during the cutting operation, and subsequent to the cutting operation until the clamping means is intentionally released. To insure vibration free interconnection between the saw table assembly and the support base assembly, abutting surfaces of both assemblies are precision ground to insure flat mating between abutted surfaces. The saw table assembly, furthermore, is constructed in two separate parts or sections, each section including a heavy horizontal plate portion reinforced along a median zone by a vertically disposed heavy plate one edge of which is securely welded to the underside of the associated plate portion of the work table. Means are provided on both sides of the vertical plate to reinforce the union between the flat horizontal plate section of the table and the vertical plate which reinforces its median zone. Such means include on the one hand a multiplicity of gussets disposed between a cantilever portion of each plate section and the dependng vertical reinforcing plate, and on the other hand heavy metallic flange members that connect the outer peripheral edge portion of each heavy horizontal plate section with the lower end of the vertical reinforcing plate. The heavy vertical plate together with the reinforcing gussets and peripheral plate members serve to define a heavy box section appropriately reinforced to damp transverse and longitudinally extending vibrations.

The two sections of the work table are precisely aligned to provide planar alignment between the two top surfaces and are then secured in such aligned position by a heavy metallic plate bolted across each opposite end in such a way as to preclude the transmission of vibration from one section of the saw table to the other section of the saw table, thus further damping any vibrations that might occur in the structure. To increase vibration free operation, the saw blade carriage includes a massive box-like structure slidably mounted on guideways attached to opposing vertical reinforcing plates on each section of the saw table so that in addition to the heavy metal plates at opposite ends which bind the ends of the saw table together, the table sections are additionally held together and reinforced by the massive saw blade carriage engaging the opposed guideways. Thus, the relationship between the saw blade and the saw table through which the saw blade extends is maintained constant throughout the longitudinal excursion of the saw blade and carriage so as to maximize the precision with which a cut may be made and prevent chattering of the various parts of the assembly due to vibration, or wobbling of the saw blade, the presence of which would prevent a smooth finish on the workpiece.

BRIEF DESCRIPTION OF THE DRAWUNGS

FIG. 3 is a vertical cross-sectional view partly in elevation, taken in the plane indicated by the line 3—3 in FIG. 2.

FIG. 4 is a fragmentary vertical sectional view taken along the plane indicated by the line 4—4 in FIG. 3.

FIG. 5 is a fragmentary vertical cross-sectional view taken along the plane indicated by the line 5—5 in FIG. 3.

FIG. 6 is a fragmentary exploded perspective view of the saw carriage, illustrating how it is mounted upon the carriageways of the table top assembly, and illustrating how the saw blade and drive motor are mounted on the carriage.

FIG. 7 is a fragmentary elevational view of the saw carriage assembly apart from any other structure, and illustrating the saw blade mounting means.

FIG. 8 is a fragmentary vertical sectional view partly in elevation illustrating the mounting of the saw carriage on the table assembly.

FIG. 9 is a fragmentary elevational view illustrating the manner of attachment of the "window shade" conveyor structure to the saw carriage.

FIG. 17 is a vertical cross-sectional view of the saw table reinforcing sections arranged in position of final assembly and showing the saw table plates in phantom in ultimate position in relation to the reinforcing sections.

FIG. 18 is an elevational view of the inside of the left end support pedestals as viewed in FIG. 15 in the direction of the arrows.

FIG. 19 is a vertical cross-sectional view of the left end pedestal taken in the plane indicated by the line 19—19 of FIG. 18.

FIG. 20 is a vertical cross-sectional view of one of the pneumatic cylinders forming a part of the clamp means.

FIG. 21 is a vertical sectional view illustrating a cut through a thick metal plate and how the plate is clamped on both sides of the cut.

DESCRIPTION OF THE PREFERRED EMBODIMENT

Figure 1:
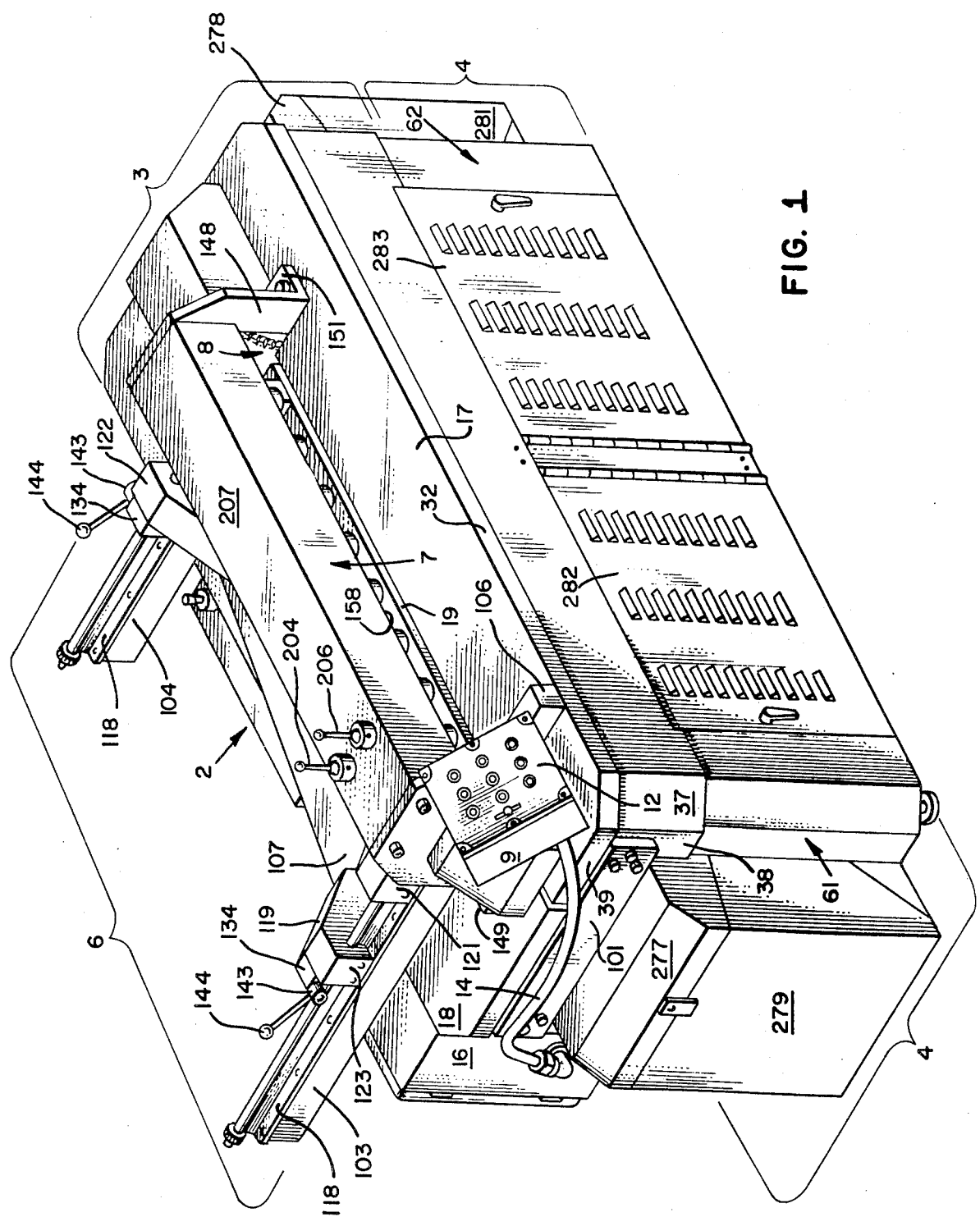
FIG. 1 is a perspective view of a preferred embodiment of the invention.

In terms of greater detail, and referring to FIG. 1, the precision saw of the invention is designated generally by the numeral 2, and includes a saw table section designated generally by the numeral 3, a saw table support base assembly designated generally by the numeral 4, a workpiece positioning assembly designated generally by the numeral 6, a workpiece clamping assembly designated generally by the numeral 7, and a power saw assembly designated generally by the numeral 8 and being disposed below the saw table assembly as illustrated in FIG. 1.

A control console 9 having a control panel 12 equipped with a multiplicity of control switches 13 is provided, connected by appropriate electrical leads 14 with a control box 16, the control elements enclosed therewithin appropriately connected to a source of electrical energy. In the interest of brevity, and since the control console 9 and its related equipment forms no part of the present invention, a detailed description of the control console 9 and its attendant control box 16 will be omitted. Where appropriate during the description which follows, the functions performed by the various parts of the precision saw structure or assembly will be described in detail.

Inasmuch as it appears that it is the construction of the various assemblies and sub-assemblies which when assembled and appropriately interrelated cooperate to produce a machine which is substantially free from vibration, it is believed most expedient to describe in detail the construction of each of the assemblies and sub-assemblies and indicate in connection with such detailed description the functional significance of its construction and its cooperative relationship with associated assemblies and sub-assemblies.

SAW TABLE ASSEMBLY

The saw table assembly designated generally by the numeral 3 includes a pair of elongated equal length heavy steel plates 17 and 18 arranged in horizontal planar alignment and spaced apart approximately ½ inch to define a saw slot 19 therebetween, the saw slot being formed by the associated edges of the plates, and extending over a major portion of the full length of the plates. As illustrated in FIG. 1, the plate 17 is somewhat narrower than plate 18 and this narrower plate 17 may be said to be associated with the "front" side of the machine, the front side of the machine being that side from which the workpiece is inserted for cutting, while the back side of the assembly may be designated as that side associated with the wider plate 18 and the work positioning gauge 6.

Figure 10:
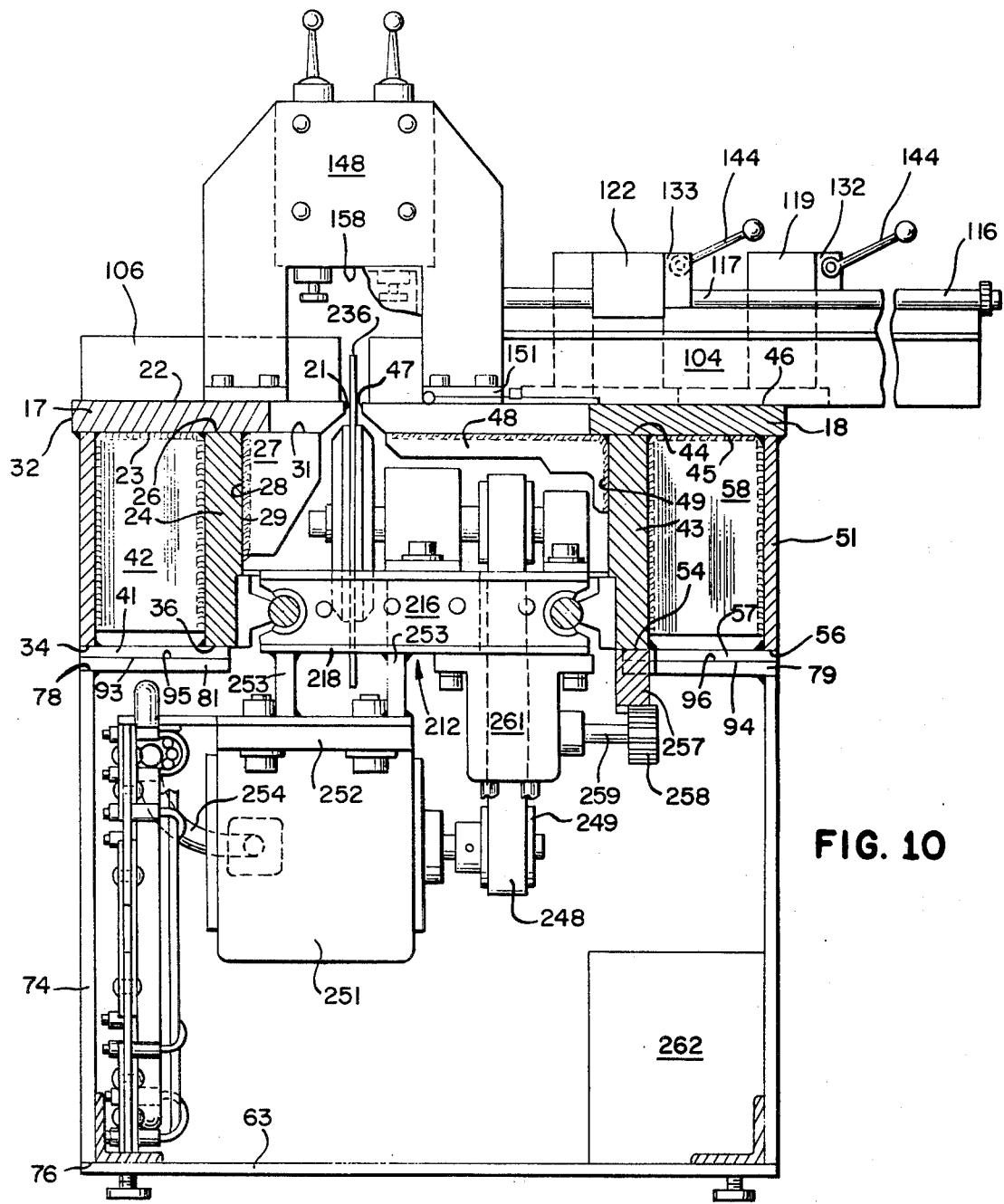
FIG. 10 is a vertical cross-sectional view of the saw assembly take in the plane indicated by the line 10—10 in FIG. 3.
Figure 12:
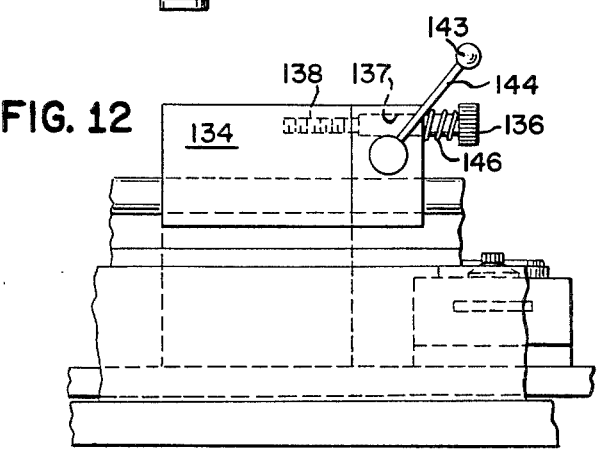
FIG. 12 is a fragmentary elevational view of the gauge plate locking means taken in the direction of the arrows 12—12 in FIG. 11.
Figure 11:
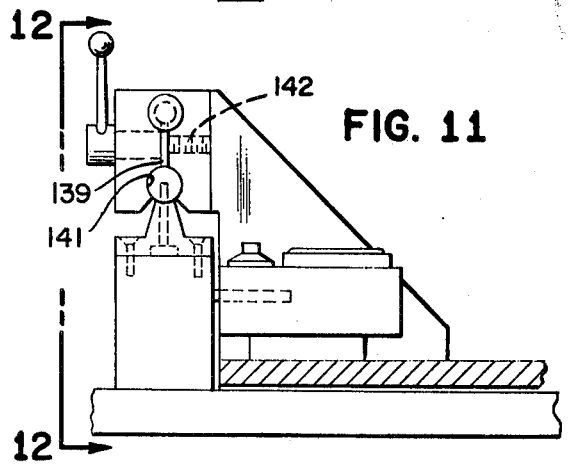
FIG. 11 is a fragmentary elevational view partly in section illustrating the gauge plate locking means.
Figure 13:
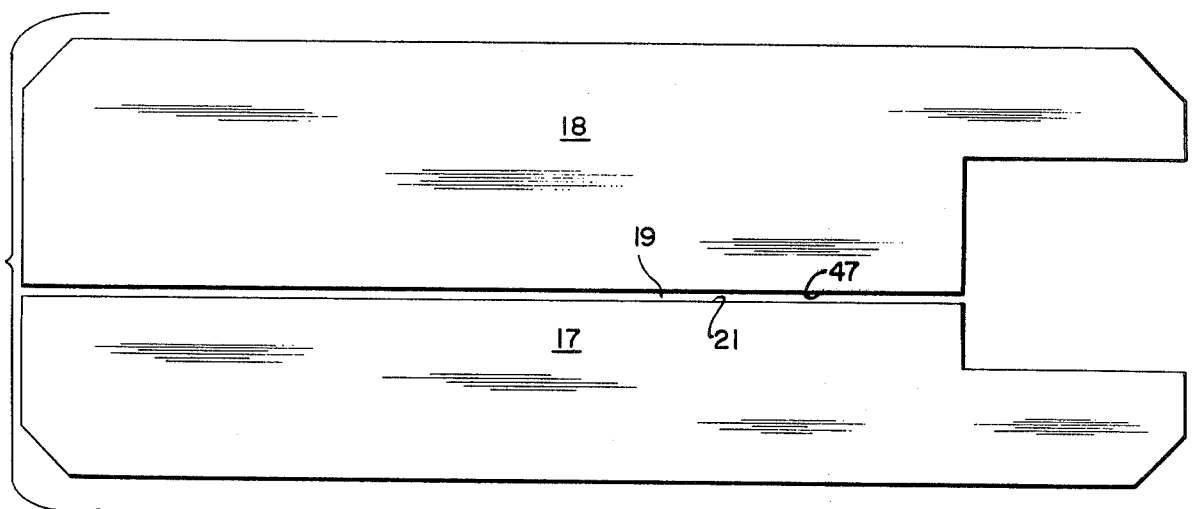
FIG. 13 is a plan view of the saw table plates apart from any other structure illustrated in their position of final assembly.

Referring to FIG. 10, it is there shown that the plate 17 is provided with a longitudinal edge 21 which defines one side of the saw slot 19. The edge 21 of the plate is undercut or beveled as shown for purposes which will hereafter be explained. The plate 17 is also provided with a top surface 22 and a lower surface 23 to the latter of which is securely welded an elongated stringer 24 in the form of a heavy plate having a thickness equivalent to the thickness of the plate 17 to which it is rigidly welded. As illustrated in FIG. 10, the upper end 26 of the reenforcing plate 24 is welded to the undersurface of plate 17 substantially along a median plane extending longitudinally of the plate 17. Because of its rigid weldment to the plate 17 along its entire length, the vertical plate 24 serves to damp any vibrations that might tend to travel transversely across the plate 17. To augument such damping effect, a series of gusset plates 27 are welded in the corner formed between the inner edge 21 of the plate 17 and the vertical reinforcing stringer 24. Gusset plates 27 are preferably approximately ten in number spaced approximately 6 inches apart along the entire length of the reinforcing stringer 24. Each of the gusset plates 27 is welded rigidly along both vertical edges 28 coincident with the surface 29 of the associated stringer 24 so as to make the union between each gusset plate 27 and the associated stringer as rigid as possible. Additionally, to increase the rigidity of the plate 17 and to increase its capability of remaining immovable despite application thereto of forces tending to cause vibration, each of the gusset plates 27 is welded along its edges 31 next adjacent the undersurfaces 23 of the plate so that, in effect, the plate 17, stringer 24 and gussets 27 become a rigid integral unit capable of damping both transversely and longitudinally applied forces tending to cause vibrations of the plate 17.

Figure 14:
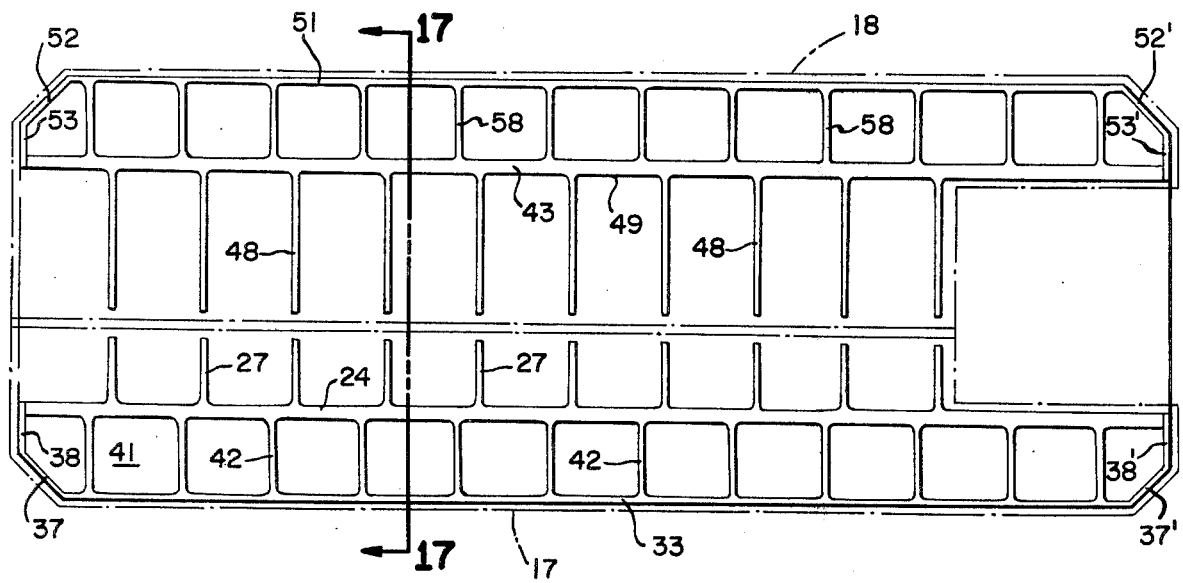
FIG. 14 is a horizontal cross-sectional view taken along the plane indicated by the line 14—14 in FIG. 3 and illustratii.g the gusset assembly on the underside of the table top plates.

To still further rigidify the plate 17, there is welded to the undersurface 23 thereof adjacent the front edge 32, a heavy metallic plate 33 in the form of a skirt that depends downwardly from the plate 17 to terminate in a lower end 34 lying in the same plane with the lower end 36 of the reinforcing stringer 24. The plate 33 not only extends adjacent to and parallel with the front edge 32 of plate 17, but adjacent opposite ends of the plate 17 the skirt plate 33 is bent around to provide an integral portion 37 lying at approximately 45° to the longitudinal dimension of the plate 17, and continuing in an integral manner to provide a transversely extending section 38 extending parallel to the end edge 39 of plate 17 and terminating adjacent and conveniently flush with the inner surface 29 of the associated reinforcing stringer 24. This construction is illustrated in FIG. 14, and from that figure it will be seen that this "wrap around" construction is used at both ends of the plate 17. To further enhance the rigidity of this section of the saw table, the lower edges 34 and 36 of the skirt plate 33 and reinforcing stringer 24, respectively, are connected adjacent each opposite end by a horizontal reinforcing plate 41 that is rigidly welded to the associated end edges 34 and 36. It will thus be seen that the outboard section of the plate 17 disposed between the longitudinal reinforcing stringer 24 and the outer edge 32 of the plate, together with the skirt plate 33 and reinforcing plate 41 define a generally rectangular chamber therebetween. To further enhance the rigidity of the saw table section in question, this rectangular chamber is provided with gussets 42, preferably 12 in number and spaced evenly along the length of the plate 17. Each of the gusset plates 42 is rigidly welded all around its perimeter on both sides of the plate to the associated structural members 17, 24, 33, and 41 so as to maximize the rigidity derived from the interconnections of these structural members. Additionally, as indicated in FIG. 14, with respect to the gusset plate 27, the gusset plates 42 are off-set, so that a gusset plate 42 is generally disposed between two associated gusset plates 27 on the opposite side of the longitudinal stringer 24.

It will thus be seen that with respect to the saw table section including the top plate 17, the structure that results is an extremely rigid elongated box-like structure capable of withstanding wracking, bending, twisting, or vibrational forces that might be imposed from any direction. Additionally, the utilization of gusset plates 27 and 42, joined as they are to the intermediate reinforcing stringer 24, enables the saw table section to immediately damp any vibrations that might be set up in the structure from whatever source.

The complimentary section of the saw table identified with top plate 18, is in like manner heavily reinforced by a longitudinally extending stringer plate 43 which extends the full length of the associated plate 18 and has its top edge 44 butted against the underside 45 of the plate 18. To effect a rigid and integral interconnection between the longitudinal stringer 43 and the plate 18, the edge portion 44 of the stringer 43 is rigidly welded along both of its edges to the underside of the plate 18. The plate 18 is also provided with an upper surface 46 which is in exact planar alignment with the corresponding surface 22 of the plate 17. Additionally, the plate 18 is provided with an inner edge 47 complementing the inner edge 21 of plate 17 to therebetween define a saw slot having a dimension of approximately ½ inch over substantially the entire length of the plates 17 and 18. The inner edge 47 of plate 18 is undercut or beveled in the same manner as the correponding edge of the plate 17 so that between the two plates there appears a ½ inch slot defined by vertical and parallel wall segments 21 and 47 which open up into angularly disposed walls defining the relief in the underside of the associated plates.

Additional rigidity is provided to the plate 18 by the interposition of gussets 48 welded to the underside of the plate 18 as shown and also welded to the inner surface 49 of the perpendicular and longitudinally extending stringer 43. Approximately 10 to 12 such gussets are provided, evenly distributed along the length of the cantilever portion of the plate 18 which extends to the left of the longitudinal stringer 43 as viewed in FIG. 10. Additional rigidity is provided by a skirt plate 51 welded to the underside of the plate 18 in the same manner as the plate 33 was welded to the underside of the plate 17, the plate 51 being wrapped around and adjacent the ends of the plate 18 to provide section 52, each lying at approximately 45° to the longitudinal dimension of the associated plate, and continuing in an integral section 53 extending transversely of the associated plate and terminating flush with the surface 49 of the longitudinal stringer 43.

As before, the lower ends 54 and 56 of the plates 43 and 51 are rigidly and integrally joined by a short horizontal reinforcing plate 57 welded to the lower edge surface 54 and 56, one of the plates 57 being provided at each opposite end of the saw table section to form a pair of pads with which the corresponding plates 41 in the opposite section of the saw table cooperate for a purpose which will hereinafter be explained. To complete the structure, a multiplicity of additional rectangular gussets 58 are disposed in the chamber between the skirt plate 51, stringer 43 and the underside of plate 18 outboard of the stringer 43. Preferably, twelve such gusset plates are provided welded around their entire perimeter on both sides thereof to the associated structure, and evenly spaced along the entire length of the outboard section of the saw table plate 18.

It will thus be seen that the saw table section associated with the table top plate 18 is formed into an extremely rigid elongated box-like structure similar to the box-like structure formed in connection with table top 17. Each of these box-like heavily reinforced table top portions is capable of withstanding all manner of forces that might be imposed thereon from any direction, and because of the heavy and repeated gussetting, each of the box-like table top sections is effective to damp any vibrations or movements of any kind that might tend to be initiated by forces from whatever source.

Up to this point, it will be understood of course that each of the box-like sections associated with the top plates 17 and 18 is an independent structure constituting a sub-assembly adapted to cooperate in a particular way with its complementary section to form a complete top plate for the saw structure. The manner in which these two separate sub-assemblies will be assembled into a composite saw table structure will be described hereinafter in greater detail.

SAW TABLE SUPPORT ASSEMBLY

To support both sub-assemblies of the saw table in planar alignment, there is provided a pair of pedestals designated generally by the numerals 61 and 62, each of the pedestals comprising a mirror image of the other and including a bottom plate 63, having a length equivalent to the overall width of the two saw table portions 17 and 18 when assembled in final form. The end edges 64 and 66 of the bottom plate are cut off to provide angularly disposed edge portions 67 and 68 which merge with rear edge 69 of the bottom plate. This plate is preferably approximately ¾ inch thick and is provided with a threaded aperture 71 adjacent the rear edge 69 and two additional apertures 72 and 73 adjacent apposite end edges 67 and 68, respectively. These apertures are provided for a purpose which will hereinafter be explained.

Welded adjacent the peripheral edges 64, 67, 69, 68 and 66, is a vertically disposed skirt plate 74, the plate having a lower edge 76 rigidly welded to the top surface of the plate 63 as shown. Also as shown, the skirt plate 74 follows the contour of the edges identified above. To enhance the rigidity of the skirt plate 74, there is provided a horizontal reinforcing plate 77 extending longitudinally of the pedestal and spaced somewhat below the top edge 78 of the skirt plate 74 as shown. The plate 77 ties the upper end portion of the skirt plate together so as to form a highly rigid structure. Additional rigidity is provided by placement of a pair of pads 79 and 81 adjacent opposite corners of the pedestal, the pad 79 being welded to the top edge 78 of the skirt plate and following the contour of the skirt plate and the edges 64, 67 and 69 of the bottom plate over a portion of the length of the top edge 78. In like manner, the pad plate 81 is superimposed and welded rigidly over the edge 78 of skirt plate 74 at the opposite corner, being superimposed over the plate edges 66, 68 and 69 and being provided with a complementary contour. The pads 79 and 81 are rigidly attached as by welding to the upper edge surface of the skirt plate 74 and serve to tie the structure into a composite whole. To lend additional rigidity to the structure, and particularly to provide additional support for the forward corner portions 82 and 83 of the pedestal plates 79 and 81, there are provided gusset plates 84 and 86 disposed in the space between the under surface 79 and 81 and the top surface of plate 77. These gussets in like manner are rigidly welded into the position shown so as to provide the requisite support for the forward edges of the plates 79 and 81. Additionally, to support the plate 77 in the area immediately below gusset plates 84 and 86, a pair of additional gusset plates 87 and 88 are provided, triangular in configuration and rigidly welded into the corner beneath the longitudinally extending plate 77 and in alignment with the gusset plates 84 and 86. It will thus be seen that the forwardly projecting flange portion 89 and 91 of each pedestal is integrally connected with the rear wall portion 92 of the pedestal, while the mounting pads 79 and 81 of each pedestal are rigidly mounted on opposite corners of the pedestal in planar alignment.

Figure 15:
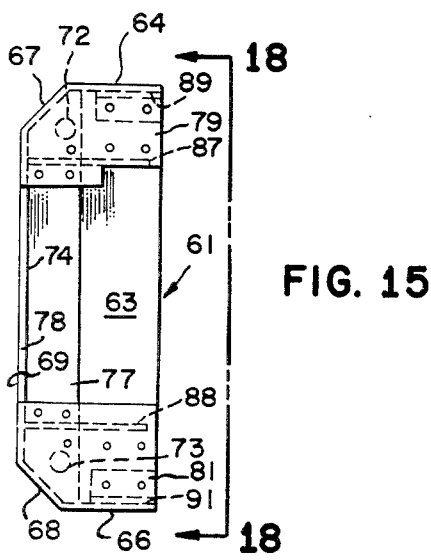
FIG. 15 is a plan view of the left end support pedestal for the table assembly, apart from any other structure.
Figure 16:
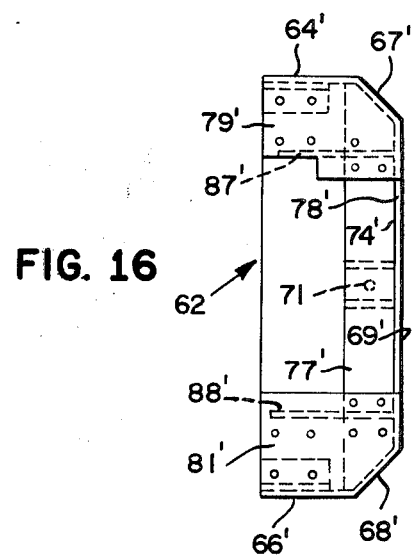
FIG. 16 is a plan view of the right support pedestal for the table assembly, shown apart from any other structure. Both support pedestals are shown in their proper positions in relation to the table top assembly illustrated in FIGS. 13 and 14.

In the interest of brevity, only one of the pedestals has been illustrated in detail, it being understood that there are two such pedestals 61 and 62 positioned in spaced relation at opposite ends of the saw structure as illustrated in FIGS. 15 and 16. Where both pedestals are illustrated, corresponding parts have been designated by corresponding primed numbers. From the foregoing it will be apparent that each of the pedestals constitutes an extremely rigid composite structure itself capable of supporting a tremendous amount of weight and being capable also of damping any vibrations that might be imposed by forces from whatever source tending to cause vibration in the structure.

In the operation of the saw structure, it is important that the two top plates 17 and 18 be held in precise planar alignment so that the top surfaces 22 and 46 of the side-by-side plates lie in the same plane. It is also important that the top surfaces 22 and 46 be perfectly flat and smooth without any interruptions such as apertures or projections that might be caused by bolt heads or screw heads such as are used to bolt conventional equipment together. For this reason, the saw table sections have been integrally welded to form a unitary structure, and no depressions or projections are provided to disrupt the smooth symmetry of the top surfaces 22 and 46. It is also important that the top surfaces 22 and 46 of the saw table sections be perfectly parallel with the lower surfaces 93 and 94 of plate pads 41 and 57 welded to the bottom edge surfaces of the reinforcing plates 33-24 and 43-51. To achieve this parallelism, each of the separate saw table sections is mounted in a massive grinding machine and the surfaces 22-93 are ground to a fine finish so that the surfaces 22 and 93 are perfectly parallel to each other.

In addition, the height between the surfaces 22 and 93 is closely controlled so that this height is precisely the same height as exists between ground surfaces 46 and 94 of the complementary section of the saw table embodying top plate 18. It will thus be seen that so long as the surfaces 93 and 94 forming the support pad for the table are supported on a flat surface, the upper surfaces 22 and 46 of the plates 17 and 18 will be perfectly aligned. To achieve this type of precision in an assembly of this type, each of the pedestals 61 and 62 is also mounted in a massive grinding machine and the top surfaces 95 and 96 of the support plates 79 and 81 are also ground perfectly flat and level one with another so that when the surfaces 93-95 abd 94-96 are brought into planar abutment as illustrated in FIG. 10, the ground surfaces are contiguous over the entire area, leaving no voids, therebetween to support maintenance of any vibrations between these abutting plates. To insure that no such vibration occurs, the outer peripheral and coincident edges of the plates 41-81 and 57-79 may be welded to permanently join each pedestal to the associated end of the saw table, or where it is more expedient, appropriate machine screws may be driven between the associated plates 41-81 and 57-79 to lock the plate pairs in tight engagement.

It will thus be seen that the extremely rigid saw table sections embodying plates 17 and 18 are supported at each opposite end by an extremely solid likewise rigid pedestal the top surfaces of which have been ground to a fine flat finish to mate precisely with the lowermost finely ground surfaces of the saw table sections. It will thus be seen that in this manner the saw table plates 17 and 18, and particularly the top finely ground surfaces 22 and 46 thereof lie in substantially exact planar alignment. To provide a measure of adjustment in the event the pedestals are supported on an uneven concrete floor, one of the pedestals is provided with a pair of adjustable support pads threadably engaging apertures 72 and 73 in the bottom plate 63 of that pedestal, while the opposite pedestal is provided with a similarly adjustable pad threadably engaging the centrally disposed aperture 71 in the opposite pedestal. The entire structure is thus supported at one end by two support pads while being supported at the opposite end on a single support pad, thus giving a three point support that will provide stability on an uneven floor surface.

To further strengthen the assembly, in addition to the interconnection of the two saw table sections through the interconnected plate pads 41-81 and 57-79, opposite ends of the two saw table sections are interconnected by a pair of generally rectangular heavy plates 101 and 102 bolted to the associated transversely extending section of the skirt plate 33 and 51 at each end. For security, the cap screws are of sufficient length to pass through the skirt plates 33 and 51 and to threadably engage appropriate bores formed in the heavy vertical reinforcing stringers 24 and 43.

WORK PIECE POSITIONING ASSEMBLY

Figure 2:
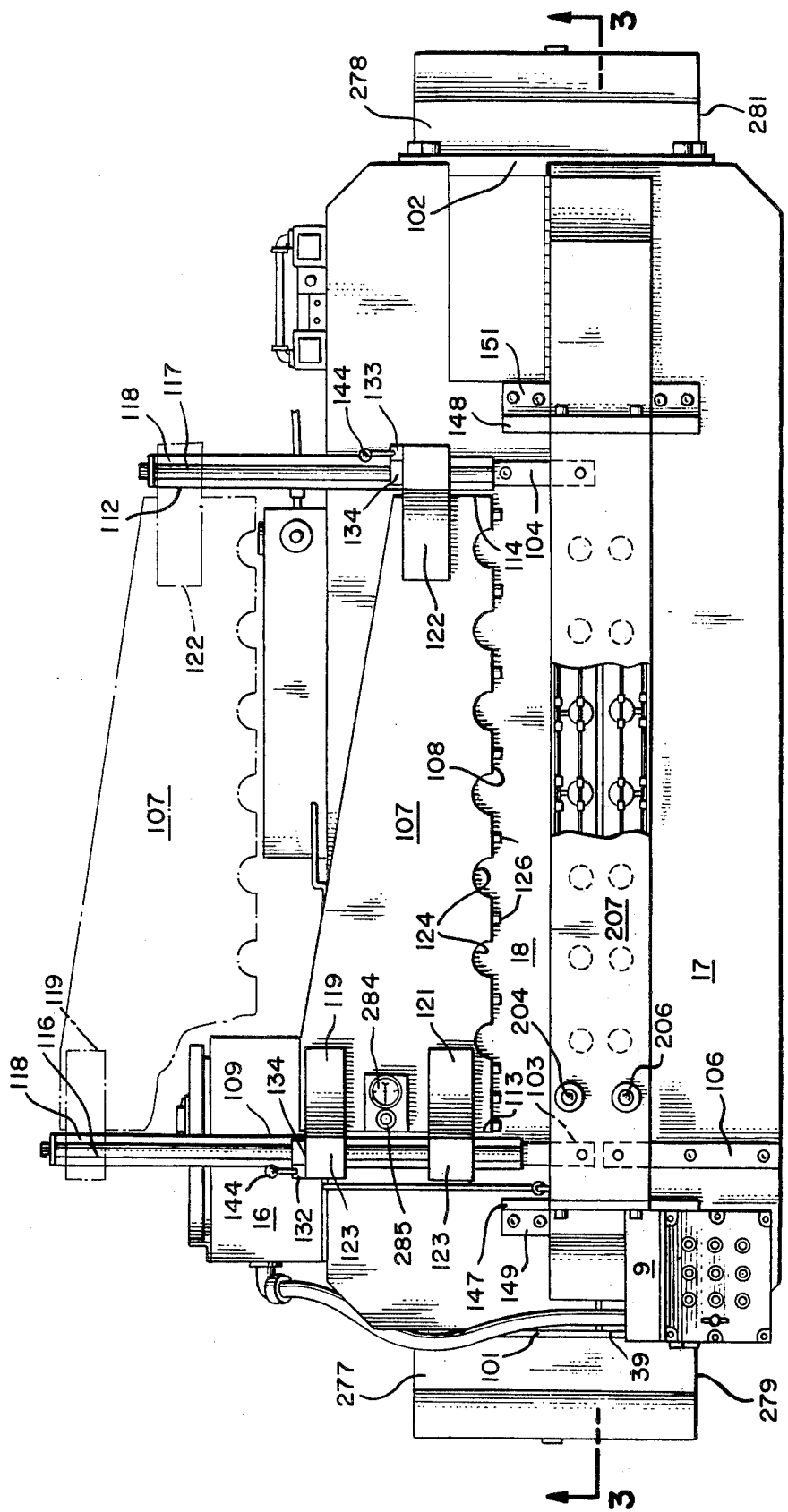
FIG. 2 is a plan view of the saw table, portions being broken away to disclose underlying structure.

To make a precise cut in a workpiece that is supported on the saw table, it is necessary that the workpiece be positioned with a high degree of accuracy. To provide such a positioning means, the saw structure of the invention is provided with the workpiece positioning assembly designated generally by the numeral 6 and including a pair of heavy rails 103 and 104 fabricated from an appropriate steel and being generally rectangular in cross-section. The rails are positioned adjacent opposite ends of the saw slot 19 and extend transversely across the table top plate 18. As illustrated in FIG. 2, both of the rails 103 and 104 terminate flush with the side edge 47 of the plate 18 which defines one wall of the saw slot 19. The rail 103, however, as illustrated in FIG. 2, is provided with an extension 106 which lies axially aligned with the rail 103, the extension commencing flush with the edge 21 of plate 17 and terminating flush with the outer edge 32 of that plate. In the embodiment illustrated, the rails 103-106 and 104 are spaced apart between their inner surfaces so that a workpiece at least 48 inches wide may be introduced into the saw structure for cutting. In this respect, the extension 106 of the rail 103, and the associated end of the rail 103, act as a guide along which the work piece may be abutted as it is inserted into the saw structure. Both rails 103 and 104, together with the extension 106 of rail 103 are appropriately bolted to the plates 17 and 18 as shown.

As illustrated in FIG. 2, the rails 103 and 104 are perfectly parallel one with the other as they extend transversely of the saw structure. Being rigidly attached by appropriate machine screws to the top surface of the plate 18, the rails 103 and 104 form an appropriate support for a gauge plate 107 having a leading edge 108 which lies next adjacent to and adjustable with respect to the saw slot 19. The gauge plate 107 is preferably generally triangular in configuration and fabricated from an appropriate metal, and has a length sufficient to extend between the inside surfaces 109 and 112, respectively, of the rails 103 and 104. The length of the gauge plate is proportioned so that operative clearance exists between the longer end edge 113 of the gauge plate and the associated side wall 109 of the rail 103, with the same clearance being provided between the shorter end edge 114 and the side wall 112 of rail 104. The gauge plate 107 is supported for precise adjustment on the rails 103 and 104 by means of elongated cylindrical bearing support rods 116 and 117, each cradled over its entire length in an appropriate bracket 118 as illustrated in FIG. 1, the bracket 118 being appropriately bolted to the top surface of the rails 103 and 104. The elongated cylindrical slide rods 116 and 117 are conveniently attached to the supporting pad by appropriate cap screws as illustrated in FIG. 8.

To moveably support the gauge plate 107 for movement transverse to the saw structure and along the support rods 116 and 117, there are provided three bearing blocks 119, 121 and 122 as illustrated in FIGS. 1, 2, 3 and 10. The bearing blocks 119 and 121 are conveniently welded to the top surface of the gauge plate 107 adjacent the end longer edge 113 thereof, and the bearing blocks are spaced apart as illustrated so that the bearing block 119 lies adjacent the rear edge of the gauge plate 107, while the bearing block 121 lies adjacent the leading edge 108 of the gauge plate 107. Additionally, the bearing blocks 119 and 121 extend cantilever fashion over the associated edge 113 of the gauge plate, and the projecting cantilever portion of each of the bearing blocks is provided with bearing assemblies 123 of the recirculating ball type which make rolling contact with the peripheral surfaces of the slide or guide rods 116 and 117.

In like manner, the bearing block 122 is provided with a cantilever portion that extends beyond the associated end edge 114 of the gauge plate, and this cantilever portion is similar in construction to the bearing portion of the bearing blocks 119 and 121, being equipped with a bearing assembly utilizing the recirculating ball type bearing to provide a substantial frictionless rolling engagement of the bearing assemblies with the associated rods 116 and 117. It will thus be seen that so long as the gauge plate 107 is not locked to the guide rods 116 and 117, the gauge plate 107 may be moved along the rods 116 and 117 with very little force. The proportions of the bearing blocks 119–122 and the mounting of the gauge plate 107 thereon is such as to provide a slight amount of operating clearance between the underside of the gauge plate 107 and the associated top surface 46 of the plate 18. By operating clearance is meant a sufficient amount of clearance to permit movement of the gauge plate 107 without actually contacting the top surface 46 of the plate 18, while being so restricted in its spacing that chips cut from the workpiece will not lodge themselves beneath the gauge plate.

The leading edge 108 of the gauge plate is provided with a multiplicity of semi-circular recesses 124 formed in the leading edge as illustrated in FIG. 2. The recesses 124 are spaced as shown for clearance around clamps when cutting narrow pieces. The leading portions of the gauge plate 107 between the recesses are provided with rest buttons or stops 126 which are preferably formed from hardened steel and provided with a fine thread engaging an appropriate bore formed in the leading edge 108 of the gauge plate so that each of the stop or rest buttons may be adjusted so that the amount that it projects from the leading edge 108 may be precisely set to within a tolerance of 0.001 inch. A set screw 128 also threaded into the adjustable gauge plate 107 is provided with a head 129 that bottoms in a recess 130 formed in the rest button so as to positively lock each rest button in its precisely adjusted position. It will thus be seen that across the front edge of the gauge plate 107, appropriate adjustment of the various stop buttons 126 may be made so that the end surfaces 131 of the stops all lie in a common plane. Thus, when a workpiece is introduced into the saw structure, the end of the workpiece may be brought to bear against the rest stops so as to precisely position the workpiece during the cutting operation.

To lock the gauge plate 107 in an adjusted position, the bearing blocks 119 and 122 are provided with lock devices 132 and 133. Each lock structure comprises a generally rectangular block 134 appropriately retained to the associated side surface of the cantilever portion of the associated bearing block by a spring pressed cap screw 136 passing through the block 134 and threadably engaging associated bearing blocks. The block 134 is provided with a recess 137 adapted to closely surround the associated slide rod 116 and 117, and is further provided with a bore 138 connected by a slit 139 with a recess 137 so that the inner peripheral surfaces 141 of the recess 137 may be squeezed together so as to constrict the recess 137 so that it binds on the associated slide rod 116. Compression of the block in a manner to restrict the slot 139 and recess 141 is provided by a lock screw 142 extending perpendicular to the slot 139 and threadably engaging the block on the side of the slot remote from a head 143. A handle 144 is provided attached to the head 143 so that the lock screw may be rotated through approximately 30° to effect locking action of the block on the associated slide rod 116 or 117.

Thus, when the lock devices 132 and 133 are in locked condition, the gauge plate may move toward the saw slot in the table a small amount as permitted by the springs 146 surrounding the shank of cap screw 136, but the gauge plate 107 cannot be moved in the opposite direction against the locking action of lock devices 132 and 133. The cap screw 136, having spring 146 surrounding a portion of its shank and resiliently bearing against the clamp block 134, retains the clamp block resiliently against the associated side of the bearing blocks 119 and 122 to permit the portions of the clamp block on opposite sides of the slot 139 to compress slightly toward each other so as to constrict the recess 141. It should be noted that if this clamp block 134 is rigidly attached to the associated bearing block the opposing portions of the clamp block on opposite sides of the slot 139 would not be permitted to move toward each other to effect the clamping action.

Having provided means for precisely positioning the workpiece on the table top, it is advantageous that means be provided associated with the table top of the saw structure to clamp the workpiece immovably yet resiliently to the top surfaces 22 and 46 of the top plates 17 and 18. In this respect, it is noted that it is advantageous in a high precision saw of the type disclosed herein to clamp not only the stock portion of the workpiece to the table top, but to also clamp thereto the portion of the workpiece to be cut from the stock portion. Accordingly, in the present embodiment, resilient clamp means are provided effective on both sides of the saw slot 19 as will hereinafter be explained. It is also advantageous that any clamping pressure be distributed evenly over both the stock portion of the workpiece and the portion of the workpiece cut therefrom so as to distribute the loads evenly over the entire length of the saw table. This has the effect of dampening any vibrations that might be set up in the workpiece or in a piece cut therefrom during the cutting operation. It is also important that the clamping means impose no pressure whatever on the gauge plate 107, and it is for this reason that semi-circular recesses 124 are provided in the leading edge of the gauge plate.

CLAMP ASSEMBLY

To accomplish these purposes, there is provided adjacent opposite ends of the saw slot 19 vertically disposed plate brackets 147 and 148. The plate support brackets are provided with anchor flanges 149 and 151 by which the support plates are rigidly bolted to the top surfaces 22 and 46 of top plates 17 and 18. Both of the vertically disposed plate brackets are generally U shaped in configuration, with opposing legs of each bracket lying on opposite sides of the saw slot 19. Bolted between the vertically extending plate brackets 147 and 148 is a beam designated generally by the numeral 152 and comprising a longitudinally extending web 153 fabricated from heavy ½ steel plate, and lying disposed above and in substantial alignment with the saw slot 19. To the bottom edge 153' of the web 153 there is welded a horizontal plate 154 of the same thickness dimension and extending on opposite sides of the web in flange portions 155 and 156 to form with the web 153 a generally inverted T-shaped beam having high rigidity. To increase such rigidity and to provide means for attachment of the beam to the plate brackets 147 and 148, the end edges of the web 153 and plate 154 are provided with gussets 157 rigidly welded thereto. Appropriate machine screws extending through the vertically disposed support plates 147 and 148 threadably engaged the gussets 157 on opposite ends of the beam to retain the beam vertically spaced above the top surfaces 22 and 46 of the saw table. In the embodiment illustrated, the lower surface 158 of the plate 154 lies approximately 6 inches above the surfaces 22 and 46 so that a workpiece of substantial thickness may be inserted below the bridge-like beam structure. For reasons which will hereinafter appear, it is important that the lower surface 158 of the beam be ground flat from one end to the other. For this purpose, prior to installation, the beam is mounted in a large grinding machine that will provide the requisite flat ground surface.

The beam structure is utilized to support a multiplicity of air cylinders designated generally by the numeral 159, this series of air cylinders being supported on the flange 155 of plate 154 while a second series of air cylinders 161 are supported in alignment on the flange 156 of plate 154. Since all of the air cylinders are identical, the description of one will suffice. Accordingly, referring to FIG. 20, each air cylinder includes an outer cylindrical housing 162 open at its upper end 163 and provided with a snap ring 164 adapted to lock into an appropriate groove 166 formed in the inner periphery 167 of the tubular cylinder. At its lower end 168, the cylinder is provided with internal threads 169 adapted to be threadably engaged by complementary threads formed on the cylinder base plate 171. The lowermost portion of each cylinder 168 is proportioned to fit snugly through an associated aperture 172 formed in the associated flange 155 or 156, and the cylinder base 171 is provided with a flat ground annular surface 173 adapted to mate with the ground surface surrounding the aperture 172. Appropriate machine screws 174 removably secure each of the cylinders to the associated flange 155 or 156.

The cylinder base 171 is provided with a centrally disposed bore 176 through which extends the polished shaft 177 on one end of which is mounted a circular clamp foot 178, while on the other end of which is mounted a piston head 179. The cylinder base 171 is provided with an appropriate seal 181 disposed in an appropriate recess 182 so as to form an airtight seal about the shaft 177 to prevent fluid under pressure from passing between the outer periphery of the shaft and the inner periphery 176 of the bore in which it is slidably disposed. For additional support of the shaft 177, the bore 176 is provided with an annular recess 183 within which is mounted a teflon brushing 184. It is well known that teflon forms an excellent lubricant and therefore utilization of the bushing 184 minimizes the frictional resistance to sliding movement of the shaft 177 through the base member 171. The piston head 179 mounted on the opposite end of the shaft 177 is likewise provided with seal means 186 disposed in an appropriate peripheral groove 187 extending circumferentially about the piston head, the seal 186 being of the nature of an "O" or "quad" ring and forming a fluid-tight seal between the periphery of the piston and the inner periphery 167 of the cylinder.

To effect reciprocation of the shaft 177 to place the clamp foot 178 in resilient pressing engagement with the workpiece disposed under the clamp beam, there is provided an end cap 188 above the piston which is also provided with a seal member 189 disposed in an appropriate peripheral groove 191 as shown. Additionally, the end plate 188 is provided with a central bore 192, suitably threaded for engagement by a correspondingly threaded nipple 193. The nipple 193 forms one portion of an air fitting 194 which may conveniently take the form of a T-fitting having oppositely projecting nipples adapted to be engaged by ferrells 196 and 197, attachment of which to the complementary nipples of the fitting 194 serve to attach flexible high pressure hoses 198 and 199 which interconnect the series of adjacent air cylinders with each other and with a source of air under pressure and appropriate control means to impose air pressure in the space 201 between the end cap 188 and the top of the piston 179. Thus, as the air pressure builds up in this chamber, the shaft 177 is caused to move downwardly, carrying the clamp foot 178 into engagement with a workpiece placed thereunder.

When it is desired to release the workpiece, the piston 179 is driven in the opposite direction by admitting air under pressure through an appropriate port 202 formed in the cylinder base 171, the port 202 appropriately being connected by a passage 203 with the interior of the cylinder 162 beneath the piston 179, thus driving the piston and the clamp foot 178 upwardly to release the workpiece. It will of course be understood that any desired amount of air pressure commensurate with the type of material being clamped may be utilized in the air cylinders. We have found that providing approximately 90 to 100 pounds per square inch pressure in each cylinder results, cumulatively, in imposing many hundreds of pounds of pressure on the workpiece distributed over an area closely adjacent to the line of cut of the workpiece and on both sides thereof, thus retaining the workpiece immovable in relation to the saw slot and the saw blade that will ultimately be passed therethrough.

As illustrated in FIG. 1, actuation of the air cylinders is effected by manipulating either one or both of the control handles 204 or 206 appropriately mounted on the sheet metal cover 207 in the form of a channel which drops over the beam and encloses the air cylinders and their attendant air hoses. It should also be noted that ports 202 formed in the cylinder bases 171 are provided with fittings 208 which pass upwardly through an appropriate aperture formed in the plate 154 so that the fitting may be connected by an air hose disposed under the cover 207. This prevents the air hoses from deteriorating due to exposure to fumes and oil scum and provides a measure of protection for an operator of the machine if one of the air hoses ruptures unexpectedly. It should be understood that through manipulation of the handles 204 and 206, each of the series of air cylinders 159 and 161 may be operated independently. Thus, when a workpiece is initially inserted into the saw, both handles may be manipulated so that both series 159 and 161 of air cylinders are actuated to clamp the workpiece on both sides of the saw slot. After the cutting operation, if it is desired to retain a clamping action on the workpiece and remove the piece of stock cut from the workpiece, the handle 204 is manipulated to actuate the air cylinders clamping the cut portion of the workpiece so as to retract the pistons and raise the clamp feet. The cut off portion of the workpiece may then be removed, and the workpiece advanced for another cut by manipulating the control handle 206 to retract the pistons in the series of cylinders 159, thus releasing the workpiece so that it may be advanced for another cut. It should be noted that when the clamp feet are in workpiece clamping position, they are concentrically disposed within the semi-circular apertures or recesses formed in the leading edge of the gauge plate.

SAW BLADE CARRIAGE ASSEMBLY

With the saw table thus constructed of highly rigid box-like construction, and the workpiece appropriately positioned by the workpiece positioning means 6 and clamped by the workpiece clamping means 7, all that is required to effect a precision cut of the workpiece is that the saw blade and saw blade carriage means be constructed and mounted on the saw table in such a manner as to prevent undue vibration of the saw table and undue "dishing" or wobbling of the saw blade as it passes through the workpiece to be cut. To accomplish these purposes, the saw blade and saw blade carriage assembly are designated generally by the numeral 8 and includes an extremely rigid carriage body designated generally by the numeral 212 and comprising three steel bars 213, 214 and 216, the bars 213–216 being arranged in an H-shaped formation, with the bars 213 and 214 being disposed across the ends of the intermediate bar 216. The bars are preferably at least 3 inches square, and after placement in the generally H-shaped configuration are retained in this relationship by plates 217 and 218 bolted to opposite sides of the bars as illustrated in FIG. 9, by a suitable number of hardened cap screws positioned to rigidly retain the structure in its assembled form. Where appropriate, the bars 213, 216 and 214 may be welded prior to application of the plates 217 and 218, and the plates may subsequently be welded to the bars.

As illustrated in FIG. 6, plates 217 and 218 along one edge of the carriage box are cut away to conform to the configuration provided by the underlying bars 213, 216 and 214, thus providing a large rectangular recess 219 as shown. On the opposite side of the bar 216 from the recess 219, the plates 217 and 218 are not cut away, but there is provided in each of the plates an aperture 221 for purposes which will hereinafter be explained.

The carriage box 212 is also provided with a plurality of linear ball bushings 222, 223, 226 and 227, these ball bushings being suitably mounted and removably clamped on the extreme ends of the bars 213 and 214 as shown. The ball bushings serve to mount the carriage frame 212 on carriageways 228 and 229 mounted on appropriate support brackets 231 and 232, respectively, as illustrated in FIG. 6. The carriageways 228 and 229 constitute case-hardened shafts machined to high tolerance and polished to receive the linear ball bushings in close relationship so that the carriage frame 212 may roll longitudinally of the ways with great accuracy and very little effort. It should be noted that for purposes of extreme precision, the inner surfaces 29 and 49 of the longitudinally extending reinforcing stringers 24 and 43 on which the brackets 231 and 232 are mounted, are ground flat to receive the correspondingly ground surfaces of the brackets 231 and 232, thus ensuring that the ways 228 and 229 are exactly parallel one with another and exactly parallel with the top surfaces 22 and 46 of the top plates 17 and 18. In this way, the relationship of the carriage frame to the top surfaces 22 and 46 is maintained constant over the entire length of the carriageways.

Mounted on the top plate 217 of the carriage frame is a shaft 232 rotatably supported in bearing blocks 233 and 234 each bolted appropriately to the top surface of the carriage frame so as to retain the shaft 232 in perfect parallelism with the top surfaces 22 and 46 of the saw table. Mounted on the shaft 232 is a saw blade 236, retained on the shaft and supported against "dishing" or wobbling by a pair of large diameter flange plates 237 and 238, the outer peripheries 239 and 241, respectively, of the flange plates extending into the recess formed by the beveled edges 21 and 47 of the saw slots 19. To ensure accuracy in the mounting of the saw blade 236, the flange plate 238 is welded to the spindle or shaft 232 against an appropriate shoulder 242 provided for that purpose and which has been machined to high precision to receive the complementarily machined surface of the flange plate. Additionally, the surface 243 of the flange plate 238 against which the saw blade must rest is carefully ground so that its surface is exactly perpendicular to the longitudinal axis of the shaft 232, which in turn lies exactly parallel to the top surfaces 22 and 46 of the saw table. In this way, it is assured that the saw blade 236 will be oriented exactly perpendicular to the associated surfaces 22 and 46, thus contributing to the accuracy of the cut made by the saw blade.

To clamp the saw blade in position, the flange plate 237 is provided with a recess 244 machined to form a snug slip fit over the end of the shaft 232 next adjacent the flange plate 238. A high strength head bolt extends through flange plate 237 and is threadably engaged in an appropriately threaded bore in the shaft 232 to clamp the flange plate against the saw blade, to thus provide two heavy flange plates on opposite sides of the saw blade to effect damping of any vibrations set up in the saw blade and to support it for a considerable distance from its rotative axis, and preferably to within very close spacing of the workpiece being cut. It will thus be seen that thus supported, the saw blade may cut efficiently through even very heavy slabs of metal, none of the efficiency of the saw blade being lost in vibrational forces that would cause the saw blade to wobble or dish and thus destroy the fine finish of the piece being cut.

As illustrated in FIG. 6, the saw blade assembly, including the retention flanges 237 and 238, are mounted so that the saw blade extends into the generally rectangular aperture 219 formed in the carriage frame. Also mounted on the shaft 232 is a pulley 247, preferably of the serrated or tooth type, which cooperates with a pulley belt 248 having complementary teeth or serrations so as to prevent slippage between the pulley and the belt. The belt 248 passes downwardly through the apertures 221 formed in the carriage frame plates 217 and 218, and engages a motor drive pulley 249 mounted on the drive shaft of a motor 251. The motor is preferably a 220/440 volt, three phase alternating current motor and is supported on an appropriate mounting plate 252 which is in turn supported from the carriage frame by a pair of mounting brackets 253. The mounting brackets may be attached to the plate 218 forming the underside of the carriage frame in any desirable manner such as appropriate machine screws. Additionally, power to the motor may be delivered thereto through an appropriate lead 254 connecting the motor to a source of electric power. For reasons which will hereinafter be explained, the electrical leads or flexible conduit 254 to the motor 251 is preferably supported over a major portion of its length by a flexible link belt 256, the conduit being secured to the link belt by appropriate ties (not shown). It will thus be seen that energization of the motor 251 will effect rotation of the drive pulley 249 with consequent rotation of the saw blade pulley 247 and the saw blade 236. Any vibration that is set up in the motor by its energization is effectively damped from the carriage frame by the brackets 253 and the flexible belt 248.

Mere rotation of the saw blade 236, however, will not cause the saw blade to be translated longitudinally along the saw slot 19 so as to effect a cut in a workpiece supported on the work table. Any such translation of the saw blade must be effected in such a way as to prevent lateral displacement or stress on the saw blade. To accomplish this purpose, there is mounted on the lower edge 54 of the vertical stringer 43 and extending the full length between the support pads 79 forming a part of spaced support pedestals 61 and 62, an elongated toothed bar in the form of a rack 257 adapted to be engaged by a toothed pinion 258 appropriately mounted on the shaft 259 of a hydraulic motor 261. The hydraulic motor is driven by hydraulic fluid taken from a hydraulic fluid reservoir 262 and pressurized by an appropriate motor and hydraulic pump assembly (not shown). The hydraulic motor 261 is preferably supported on the underside of the carriage frame 212, and in response to the flow of hydraulic fluid therethrough in one direction or the other, causes the pinion 258 to rotate, thus driving the carriage 212 either to the left or to the right as viewed in FIG. 1. When the carriage moves to the left as viewed in FIG. 1, assuming the motor 251 has been energized to rotate the saw blade, the rotating saw blade will pass through a workpiece supported on the saw table. When the saw blade has reached its full excursion, manual or automatic means may be manipulated to stop the hydraulic motor 261 and reverse its direction of rotation so as to return the saw blade and saw carriage to its initial position. The control means by which such automatic operation of the saw blade and saw carriage frame is effected form no part of this invention and are therefore not described. It should be understood however that many different types of control means may be utilized to effect this function.

To ensure that the saw blade is cooled during its operation, there is provided mounted on the top plate 217 of the carriage frame a bracket 263 on which is supported an upwardly extending arm 264 which in turn supports a small conduit 266 having a discharge end 267 disposed over the teeth of the saw blade, and through which may be discharged a coolant fluid from an appropriate source (not shown).

It has also been found that during the cutting operation, chips of metal are driven downwardly by the saw blade and if not prevented, would collect in a pile on the floor beneath the saw table. To obviate this undesirable condition, a screen assembly is provided designated generally by the numeral 271 and constituting conveyor sections 272 and 273 connected to opposite ends of the carriage frame 212 and caused to move with the carriage by the hydraulic motor 261. At opposite ends of the saw table, each of the conveyor sections 272 and 273, which are preferably flexible in the nature of a horizontal "window shade," are caused to wrap up on a pair of spindles 274 and 276, each being provided with a heavy coil spring (not shown) which tensions the associated conveyor section 272 or 273 depending on the direction in which the carriage frame 212 moves. For instance, with the carriage frame and saw blade at the extreme right of the saw table in inactive position prior to making a cut through a workpiece, the spindle 276 would have wrapped thereon a large proportion of section 273. In this position the coil spring associated with the spindle 276 would be in a relatively relaxed condition. On the other hand, because the conveyor section 272 is extended to fill the gap between the spindle 274 on the left end of the saw table and the associated edge of the carriage 212 which is spaced therefrom, the spring associated with the spindle 274 will be tensioned by the unwrapping action of the conveyor section 272. Since the spindles 274 and 276 are held in position on conveyor housings 277 and 278, respectively, it will be seen that as the carriage frame is translated to the left or to the right, any chips lying on the top surface of the conveyor sections 272 and 273 will fall into the hoppers 279 and 281 associated, respectively, with the conveyor sections 272 and 273. Accordingly, the metal chips are prevented from falling to the floor, and may be collected over a considerable period of time in the hoppers. The hoppers may then be removed and emptied into appropriate containers so that the metal chips may be recycled.

To enclose the saw table pedestals, appropriate access doors 282 and 283 are provided on opposite sides of the structure so that access may be had to the internal mechanism of the saw structure from opposite sides of the machine.

Additionally, to provide a means by which movement of the gauge plate 107 may be measured, a dial gauge 284 is provided mounted on the gauge plate 107 and is provided with a rotatable wheel 285 bearing against the side surface of the beam 118 so that as the gauge plate 107 is moved, rotation of the wheel 285 is translated into an indication of the linear movement of the gauge plate on the gauge 284. Preferably, the gauge is set at zero when the aligned surfaces 131 of the stop buttons 126 coincide with the associated surface of the saw blade 236, thus ensuring great accuracy in any cut that is made by the saw.

Having thus described the invention, what is claimed to be novel and sought to be protected by Letters Patent is as follows.

I claim:

1. A high speed precision metal cutting power saw assembly, comprising:
   a. a saw table assembly including front and rear sections having horizontal plate portions with corresponding surfaces arranged in planar alignment and connected in spaced relation to define a saw slot therebetween;
   b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
   c. a saw blade carriage assembly mounted on said saw table assembly below said horizontal plate portions and including:
      1. elongated carriageways extending longitudinally of the saw table assembly and parallel to said saw slot,
      2. a saw blade carriage body movably mounted on said carriageways for selective translation therealong parallel to said saw slot,
      3. a circular saw blade rotatably mounted on said carriage body and arranged to extend through said saw slot so as to cut a workpiece supported thereabove on said horizontal plate portions of said saw table assembly, and
      4. a motor mounted on said carriage body and operatively connected to effect rotation of said saw blade when energized;
   d. means for accurately positioning a workpiece to be cut including a stop plate movably mounted on the rear section of the saw table assembly independently of the front section thereof and adjustable toward and away from said saw slot, and means for locking the stop plate in a selected position;
   e. means for clamping a workpiece to be cut to the saw table assembly including a plurality of independently operated rams adapted to selectively impinge on the workpiece; and
   f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways.

2. The combination according to claim 1, in which means are provided disposed below said saw slot to intercept and collect metal chips resulting from the cutting operation.

3. A high speed precision metal cutting power saw assembly, comprising:
   a. a saw table assembly including front and rear sections having horizontal plate portions with corresponding surfaces arranged in planar alignment and connected in spaced relation to define a saw slot therebetween;
   b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
   c. a saw blade carriage assembly mounted on said saw table assembly below said horizontal plate portions and including:
      1. elongated carriageways extending longitudinally of the saw table assembly and parallel to said saw slot,
      2. a saw blade carriage body movably mounted on said carriageways for selective translation therealong parallel to said saw slot,
      3. a circular saw blade rotatably mounted on said carriage body and arranged to extend through said saw slot so as to cut a workpiece supported thereabove on said horizontal plate portions of said saw table assembly, and
      4. a motor mounted on said carriage body and operatively connected to effect rotation of said saw blade when energized;
   d. means for accurately positioning a workpiece to be cut including a stop plate movably mounted on the rear section of the saw table assembly and adjustable toward and away from said saw slot, and means for locking the stop plate in a selected position;
   e. means for clamping a workpiece to be cut to the saw table assembly including a plurality of independently operated rams adapted to selectively impinge on the workpiece; and
   f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;

g. said front and rear sections of the saw table assembly being each provided with a vertically depending reinforcing plate welded to the associated horizontal plate portion along a median zone thereof to form a generally T-shaped beam of each section, said vertical depending reinforcing plates of the front and rear sections being spaced on opposite sides of said saw slot, and said carriageways being mounted adjacent the edges thereof remote from the horizontal plate portions.

4. A high speed precision metal cutting power saw assembly, comprising:
   a. a saw table assembly including front and rear sections having horizontal plate portions with corresponding surfaces arranged in planar alignment and connected in spaced relation to define a saw slot therebetween;
   b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
   c. a saw blade carriage assembly mounted on said saw table assembly below said horizontal plate portions and including:
      1. elongated carriageways extending longitudinally of the saw table assembly and parallel to said saw slot,
      2. a saw blade carriage body movably mounted on said carriageways for selective translation therealong parallel to said saw slot,
      3. a circular saw blade rotatably mounted on said carriage body and arranged to extend through said saw slot so as to cut a workpiece supported thereabove on said horizontal plate portions of said saw table assembly, and
      4. a motor mounted on said carriage body and operatively connected to effect rotation of said saw blade when energized;
   d. means for accurately positioning a workpiece to be cut including a stop plate movably mounted on the rear section of the saw table assembly and adjustable toward and away from said saw slot, and means for locking the stop plate in a selected position;
   e. means for clamping a workpiece to be cut to the saw table assembly including a plurality of independently operated rams adapted to selectively impinge on the workpiece; and
   f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;
   g. said front and rear saw table sections each comprising box-like structures including said horizontal plate portion closing the top side thereof and providing a cantilever flange portion extending therefrom, a vertical plate welded along a median zone of the horizontal plate portion to form an elongated generally T-shaped beam, a skirt plate welded along a peripheral edge of the horizontal plate portion and cooperating therewith and with said vertical plate to form a box open at its lower end, and spaced mounting pads welded across opposite open end portions of said box section and adapted to overlie said saw table support base assembly whereby adjacent edges of the juxtaposed cantilever flanges on the front and rear sections define the same slot and said horizontal plates are retained in planar alignment.

5. A high speed precision metal cutting power saw assembly, comprising:
   a. a saw table assembly including front and rear sections having horizontal plate portions with corresponding surfaces arranged in planar alignment and connected in space relation to define a saw slot therebetween;
   b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
   c. a saw blade carriage assembly mounted on said saw table assembly below said horizontal plate portions and including:
      1. elongated carriageways extending longitudinally of the saw table assembly and parallel to said saw slot,
      2. a saw blade carriage body movably mounted on said carriageways for selective translation therealong parallel to said saw slot,
      3. a circular saw blade rotatably mounted on said carriage body and arranged to extend through said saw slot so as to cut a workpiece supported thereabove on said horizontal plate portions of said saw table assembly, and
      4. a motor mounted on said carriage body and operatively connected to effect rotation of said saw blade when energized;
   d. means for accurately positioning a workpiece to be cut including a stop plate movably mounted on the rear section of the saw table assembly and adjustable toward and away from said saw slot, and means for locking the stop plate in a selected position;
   e. means for clamping a workpiece to be cut to the saw table assembly including a plurality of independently operated rams adapted to selectively impinge on the workpiece; and
   f. means for effectimg translation of the saw blade carriage body along said carriageways whereby said saw blade passes along saw slot, said means including a toothed rack mounted on said saw table assembly parallel to said carriageways and a motor driven pinion on said carriage body operatively engaging the toothed rack whereby rotation of the pinion effect movement thereof and of said carrige body longitudinally along the carriageways;
   g. said front and rear saw table section each comprising a box-like structure, said horizontal plate portion constituting one side thereof, and mounting pads spaced from said horizontal plate constituting an opposite side, said mounting pads and said horizontal plate having surfaces that are precision ground flat and parallel.

6. A high speed precision metal cutting power saw assembly, comprising:
 a. a saw table assembly including front and rear sections having horizontal plate portions with corresponding surfaces arranged in planar alignment and connected in spaced relation to define a saw slot therebetween;
 b. a saw table support base assembly including a pair of pedestals to underlie opposite ends of said saw table assembly whereby said front and rear sections thereof span the space between the pedestals and are supported thereby so that said corresponding surfaces of said front and rear sections lie in planar alignment;
 c. a saw blade carriage assembly mounted on said saw table assembly below said horizontal plate portions and including:
  1. elongated carriageways extending longitudinally of the saw table assembly and parallel to said saw slot,
  2. a saw blade carriage body movably mounted on said carriageways for selective translation therealong parallel to said saw slot,
  3. a circular saw blade rotatably mounted on said carriage body and arranged to extend through said saw slot so as to cut a workpiece supported thereabove on said horizontal plate portions of said saw table assembly, and
  4. a motor mounted on said carriage body and operatively connected to effect rotation of said saw blade when energized;
 d. means for accurately positioning a workpiece to be cut including a stop plate movably mounted on the rear section of the saw table assembly and adjustable toward and away from said slot, and means for locking the stop plate in a selected position;
 e. means for clamping a workpiece to be cut to the saw table assembly including a plurality of independently operated rams adapted to selectively impinge on the workpiece; and
 f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;
 g. said front and rear sections of the saw table assembly being each provided with a vertically depending reinforcing plate welded to the associated horizontal plate portion along a median zone thereof to form a generally T-shaped beam, and a multiplicity of gusset plates welded between the horizontal plate portion and the vertical plate on both sides of the latter and spaced uniformly therealong whereby the cantilever portion of the horizontal plate portion on opposite sides of the vertical plate is supported to its peripheral edge remote from the vertical plate.

7. A high speed precision metal cutting power saw assembly, comprising:
 a. a saw table assembly including front and rear sections having horizontal plate portions with corresponding surfaces arranged in planar alignment and connected in spaced relation to define a saw slot therebetween;
 b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
 c. a saw blade carriage assembly mounted on said saw table assembly below said horizontal plate portions and including:
  1. elongated carriageways extending longitudinally of the saw table assembly and parallel to said saw slot,
  2. a saw blade carriage body movably mounted on said carriageways for selective translation therealong parallel to said saw slot,
  3. a circlar saw blade rotatably mounted on said carriage body and arranged to extend through said saw lot so as to cut a workpiece supported thereabove on said horizontal plate portions of said saw table assembly, and
  4. a motor mounted on said carriage body and operatively connected to effect rotation of said saw blade when energized;
 d. means for accurately positioning a workpiece to be cut including a stop plate movably mounted on the rear section of the saw table assembly and adjustable toward and away from said saw slot, and means for locking the stop plate in a selected position;
 e. means for clamping a workpiece to be cut to the saw table assembly including a plurality of independently operated rams adapted to selectively impinge on the workpiece; and
 f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;
 g. said front and rear sections of the saw table assembly being each provided with a vertically depending reinforcing plate welded to the associated horizontal plate portion along a median zone thereof to form a generally T-shaped beam, and a mounting pad welded to the beam at each opposite end and adapted to overlie said support base assembly.

8. A high speed precision metal cutting power saw assembly, comprising:
 a. a saw table assembly including front and rear sections having horizontal plate portions with corresponding surfaces arranged in planar alignment and connected in spaced relation to define a saw slot therebetween;
 b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;

c. a saw blade carriage assembly mounted on said saw table assembly below said horizontal plate portions and including:
  1. elongated carriageways extending longitudinally of the saw table assembly and parallel to said saw slot,
  2. a saw blade carriage body movably mounted on said carriageways for selective translation therealong parallel to said saw slot,
  3. a circular saw blade rotatably mounted on said carriage body and arranged to extend through said saw slot so as to cut a workpiece supported thereabove on said horizontal plate portions of said saw table assembly, and
  4. a motor mounted on said carriage body and operatively connected to effect rotation of said saw blade when energized;
d. means for accurately positioning a workpiece to be cut including a stop plate movable mounted on the rear section of the saw table assembly and adjustable toward and away from said slot, and means for locking the stop plate in a selected position;
e. means for clamping a workpiece to be cut to the saw table assembly including a plurality of independently operated rams adapted to selectively impinge on the workpiece; and
f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;
g. each pedestal of the pair constituting the support base assembly comprising:
  a. a bottom plate;
  b. a skirt plate welded to selected edges of the bottom plate;
  c. an intermediate plate parallel to the bottom plate and spaced therefrom and welded to the skirt plate; and
  d. spaced support pads welded adjacent opposite corners of the skirt plate remote from the bottom plate and providing spaced surfaces on which the saw table assembly is supported.

9. The combination according to claim 8, in which the spacing between said spaced support pads corresponds to the spacing between the front and rear sections of said saw table assembly whereby corresponding ends of said front and rear sections are supported on a pedestal common to both.

10. The combination according to claim 8, in which gussets are provided welded between each support pad and the skirt plate to rigidity said support pads.

11. The combination according to claim 8, in which the surfaces of said support pads are precision ground flat and lie in planar alignment whereby the horizontal plates of said front and rear sections of the saw table assembly will lie in planar alignment when supported on said support pads.

12. The combination according to claim 1, in which said carriage body comprises a generally H-shaped frame closed on opposite sides by steel plates, and linear ball bushing assemblies mounted on each corner of the frame operatively engage said elongated carriageways.

13. The combination according to claim 12, in which said saw blade carriage assembly includes a saw blade drive shaft mounted on one side of said carriage body and said motor is mounted on the other side thereof, and a drive belt extends through said carriage body from one side thereof to the other to connect said motor to said saw blade drive shaft.

14. The combination according to claim 1, in which said means for accurately positioning a workpiece on said saw table includes a pair of rails mounted at opposite ends of the saw table and extending perpendicular to the saw slot and parallel to each other, and said stop plate is generally triangular in configuration, the rear edge thereof being angularly disposed with respect to the front edge thereof, opposite ends of said generally triangular plate being supported by and selectively movable along said rails toward and away from said saw slot, the shorter end of said generally triangular plate having attached thereto a single bearing assembly while the longer end thereof has attached thereto a spaced pair of bearing assemblies, said bearing assemblies rollably engaging said rails.

15. The combination according to claim 1, in which said stop plate lies spaced above the horizontal plate portion of the rear section of the saw table assembly an amount sufficient to provide operating clearance therebetween but insufficient to permit chips cut from the workpiece to lodge themselves thereunder.

16. The combination according to claim 14, in which said rails include cylindrical shafts, and linear ball bushings are mounted on said stop plate and operatively engage said shafts.

17. The combination according to claim 1, in which said means for clamping a workpiece to the saw table includes two parallel series of independently air operated rams including at least two rams in each series, the rams in each series being spaced apart in a direction extending longitudinally of the saw table and one series of rams being spaced from the other in a direction extending transversely of the saw table, whereby when said rams are actuated one series of rams engages a workpiece on one side of the saw table slot while the other series of rams engages the workpiece on the opposite side of the saw table slot.

18. The combination according to claim 1, in which means are provided disposed below said saw slot extending longitudinally thereof to intercept and collect metal chips generated by the saw blade as it cuts through a metal workpiece.

19. A high speed precision metal cutting power saw assembly, comprising:
  a. a saw table assembly including front and rear sections having horizontal plate portions with corresponding surfaces arranged in planar alignment and connected in spaced relation to define a saw slot therebetween;
  b. a saw table support base assembly including a pair of pedestals spaced to underlie opposite ends of said saw table assembly whereby said front and rear sections thereof span the sapce between the pedestals and are supported thereby so that said corresponding surfaces of said front and rear sections lie in planar alignment;
  c. a saw blade carriage assembly mounted on said saw table assembly below said horizontal plate portions and including:

1. elongated carriageways extending longitudinally of the saw table assembly and parallel to said saw slot,
  2. a saw blade carriage body movably mounted on said carriageways for selective translation therealong parallel to said saw slot,
  3. a circular saw blade rotatably mounted on said carriage body and arranged to extend through said saw slot so as to cut a workpiece supported thereabove on said horizontal plate portions of said saw table assembly, and
  4. a motor mounted on said carriage body and operatively connected to effect rotation of said saw blade when energized,
d. means for accurately positioning a workpiece to be cut including a stop plate movably mounted on the rear section of the saw table assembly and adjustable toward and away from said saw slot, and means for locking the stop plate in a selected position;
e. means for clamping a workpiece to be cut to the saw table assembly including a plurality of independently operated rams adapted to selectively impinge on the workpiece; and
f. means for effecting translation of the saw blade carriage body along said carriageways whereby said saw blade passes along said saw slot, said means including a toothed rack mounted on said saw table assembly parallel to said carriageways and a motor driven pinion on said carrige body operatively engaging the toothed rack whereby rotation of the pinion effects movement thereof and of said carriage body longitudinally along the carriageways;
g. said fron and rear sections of the saw table assembly being each provided with a vertically depending reinforcing plate welded to the associated horizontal plate portion along a median zone thereof to form a generally T-shaped beam of each section, said carriageways constituting case-hardened shafts machined to high tolerance, one each of said shafts being mounted on one of said vertical plates in parallel relation to the other, to said saw slot and to said corresponding surfaces of said horizontal plates lying in planar alignment.

20. A high speed precision metal cutting power saw assembly, comprising:
a. a saw table assembly including front and rear sections having horizontal plate portions with corresponding surfaces arranged in planar alignment and connected in spaced relation to define a saw slot therebetween;
b. a saw table support base assembly including a pair of pedestals spaced to underlie opposite ends of said table assembly whereby said front and rear sections thereof span the space between the pedestals and are supported thereby so that said corresponding surfaces of said front and rear sections lie in planar alignment;
c. a saw blade carriage assembly mounted on said saw table assembly below said horizontal plate portions and including:
  1. elongated carriageways extending longitudinally of the saw table assembly and parallel to said saw slot,
  2. a saw blade carriage body movably mounted on said carrriageways for selective translation therealong parallel to said saw slot,
  3. a circular saw blade rotatably mounted on said carriage body and arranged to extend through said saw slot so as to cut a workpiece supported thereabove on said horizontal plate portions of said saw table assembly, and
  4. a motor mounted on said carriage body and operatively connected to effect rotation of said saw blade when energized;
d. means for accurately positioning a workpiece to be cut including a stop plate movably mounted on the rear section of the saw table assembly and adjustable toward and away from said saw slot, and means for locking the stop plate in a selected position;
e. means for clamping a workpiece to be cut to the saw table assembly including a plurality of independently operated ram adapted to selectively impinge on the workpiece; and
f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;
g. the edge of said stop plate next adjacent the saw slot being provided with a multiplicity of recesses correlated in size and position with said independently operated rams whereby clearance is provided about said rams by the leading edge of the stop plate.

21. A high speed precision metal cutting power saw assembly, comprising:
a. a saw table assembly including front and rear sections having horizontal plate portions with corresponding surfaces arranged in planar alignment and connected in spaced relation to define a saw slot therebetween;
b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
c. a saw blade carriage assembly mounted on said saw table assembly below said horizontal plate portion and including:
  1. elongated carriageways extending longitudinally of the saw table assembly and parallel to said saw slot,
  2. a saw blade carriage body movably mounted on said carriageways for selective translation therealong parallel to said saw slot,
  3. a circular saw blade rotatably mounted on said carriage body and arranged to extend through said saw slot so as to cut a workpiece supported thereabove on said horizontal plate portions of said saw table assembly, and
  4. a motor mounted on said carriage body and operatively connected to effect rotation of said saw blade when energized;
d. means for accurately positioning a workpiece to be cut including a stop plate movably mounted on the rear section of the saw table assembly and adjustable toward and away from said saw slot, and means for locking the stop plate in a selected position;

e. means for clamping a workpiece to be cut to the saw table assembly including a plurality of independently operated rams adapted to selectively impinge on the workpiece; and f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;

g. adjustable stop buttons being provided in the leading edge of said stop plate next adjacent the saw slot and adjustable to provide stop surfaces all lying in the same plane and parallel to the saw slot.

22. A high speed precision metal cutting power saw assembly, comprising:

a. a saw table assembly including front and rear sections having horizontal plate portions with corresponding surfaces arranged in planar alignment and connected in spaced relation to define a saw slot therebetween;

b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;

c. a saw blade carriage assembly mounted on said saw table assembly below said horizontal plate portions and including:
   1. elongated carriageways extending longitudinally of the saw table assembly and parallel to said saw slot,
   2. a saw blade carriage body movably mounted on said carriageways for selective translation therealong parallel to said saw slot,
   3. a circular saw blade rotatably mounted on said carriage body and arranged to extend through said saw slot so as to cut a workpiece supported thereabove on said horizontal plate portions of said saw table assembly, and
   4. a motor mounted on said carriage body and operatively connected to effect rotation of said saw blade when energized;

d. means for accurately positioning a workpiece to be cut including a stop plate movably mounted on the rear section of the saw table assembly and adjustable toward and away from said saw slot, and means for locking the stop plate in a selected position;

e. means for clamping a workpiece to be cut to the saw table assembly including a plurality of independently operated rams adapted to selectively impinge on the workpiece; and f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;

g. means disposed below said saw slot extending longitudinally thereof to intercept and collect metal chips generated by the saw blade as it cuts through a metal workpiece, h. said chip collector means comprising an elongated screen-like member remote opposite ends of which are rollably connected to associated resiliently biased spindles while adjacent ends are detachably secured to the saw blade carriage assembly.

23. A high speed precision metal cutting power saw assembly, comprising:

a. a saw table assembly including front and rear sections having horizontal plate portions with corresponding surfaces arranged in planar alignment and connected in spaced relation to define a saw slot therebetween;

b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;

c. a saw blade carriage assembly mounted on said saw table assembly below said horizontal plate portions and including:
   1. elongated carriageways extending longitudinally of the saw table assembly and parallel to said saw slot,
   2. a saw blade carriage body movably mounted on said carriageways for selective translation therealong parallel to said saw slot,
   3. a circular saw blade rotatably mounted on said carriage body and arranged to extend through said saw slot so as to cut a workpiece supported thereabove on said horizontal plate portions of said saw table assembly, and
   4. a motor mounted on said carriage body and operatively connected to effect rotation of said saw blade when energized;

d. means for accurately positioning a workpiece to be cut including a stop plate movably mounted on the rear section of the saw table assembly and adjustable toward and away from said saw slot, and means for locking the stop plate in a selected position;

e. means for clamping a workpiece to be cut to the saw table assembly including a plurality of independently operated rams adapted to selectively impinge on the workpiece; and f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;

g. means disposed below said saw slot extending longitudinally thereof to intercept and collect metal chips generated by the saw blade as it cuts through a metal workpiece;

h. chip collection bins at opposite ends of the saw table, said chip collector means being operative to dump collected chips into said bins.

24. The combination according to claim 23, in which said chip collection bins are detachably supported on said saw table assembly.

25. A high speed precision metal cutting power saw assembly, comprising:
- a. a saw table assembly including front and rear sections having horizontal plate portions with corresponding surfaces arranged in planar alignment and connected in spaced relation to define a saw slot therebetween;
- b. a saw table support base assembly including a pair of pedestals spaced to underlie opposite ends of said saw table assembly whereby said front and rear sections thereof span the space between the pedestals and are supported thereby so that said corresponding surfaces of said front and rear sections lie in planar alignment;
- c. a saw blade carriage assembly mounted on said saw table assembly below said horizontal plate portions and including:
  1. elongated carriageways extending longitudinally of the saw table assembly and parallel to said saw slot,
  2. a saw blade carriage body movably mounted on said carriageways for selective translation therealong parallel to said saw slot,
  3. a circular saw blade rotatably mounted on said carriage body and arranged to extend through said saw slot so as to cut a workpiece supported thereabove on said horizontal plate portions of said saw table assembly, and
  4. a motor mounted on said carriage body and operatively connected to effect rotation of said saw blade when energized;
- d. means for accurately positioning a workpiece to be cut including a stop plate movably mounted on the rear section of the saw table assembly and adjustable toward and away from said saw slot, and means for locking the stop plate in a selected position;
- e. means for clamping a workpiece to be cut to the saw table assembly including a plurality of independently operated rams adapted to selectively impinge on the workpiece; and
- f. means for effecting translation of the saw blade carriage body along said carriageways whereby said saw blade passes along said saw slot, said means including a toothed rack mounted on said saw table assembly parallel to said carriageways and a motor driven pinion on said carriage body operatively engaging the toothed rack whereby rotation of the pinion effects movement thereof and of said carriage body longitudinally along the carriageways;
- g. means disposed below said saw slot extending longitudinally thereof to intercept and collect metal chips generated by the saw blade as it cuts through a metal workpiece;
- h. said chip collector means comprising an elongated screen-like member, means to maintain the screen-like member taut, and spindle means at opposite ends of the saw table adapted to receive said screen-like member upon translation of said saw blade carriage body.

* * * * *